(No Model.)  11 Sheets—Sheet 1.

C. E. ALLEN.
LINOTYPE MACHINE.

No. 562,563.  Patented June 23, 1896.

Witnesses:  Inventor;
Charles Elmer Allen
F. F. Johnson,
Atty.

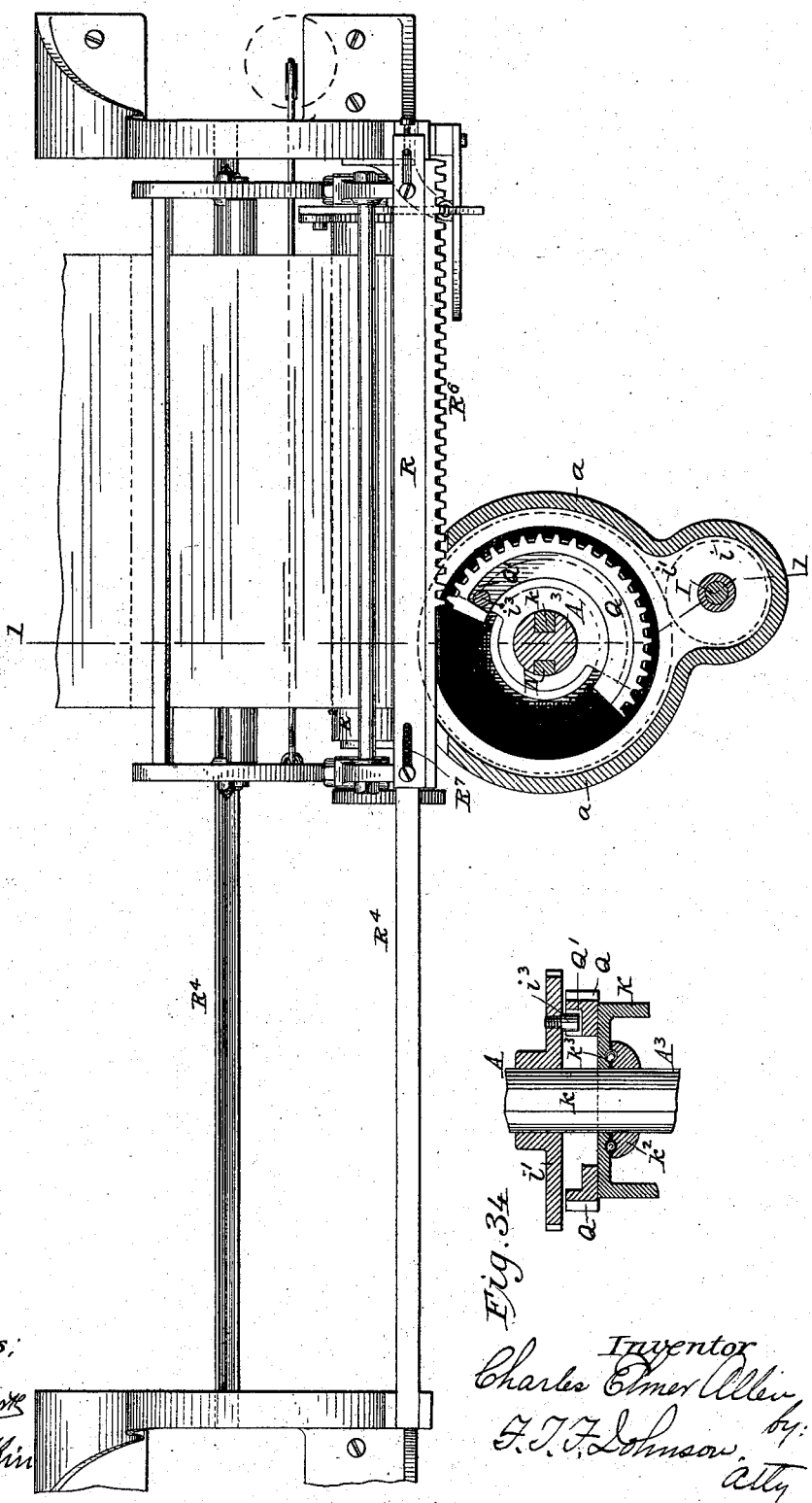

(No Model.)   11 Sheets—Sheet 3.
C. E. ALLEN.
LINOTYPE MACHINE.
No. 562,563.   Patented June 23, 1896.
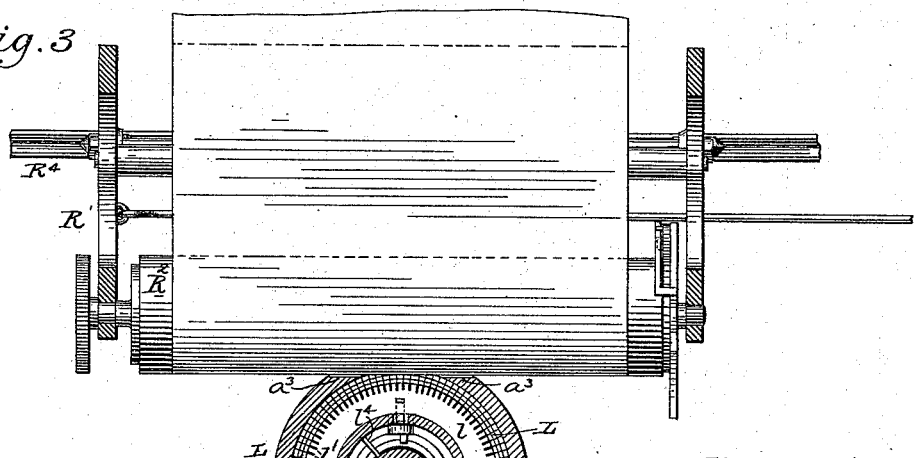
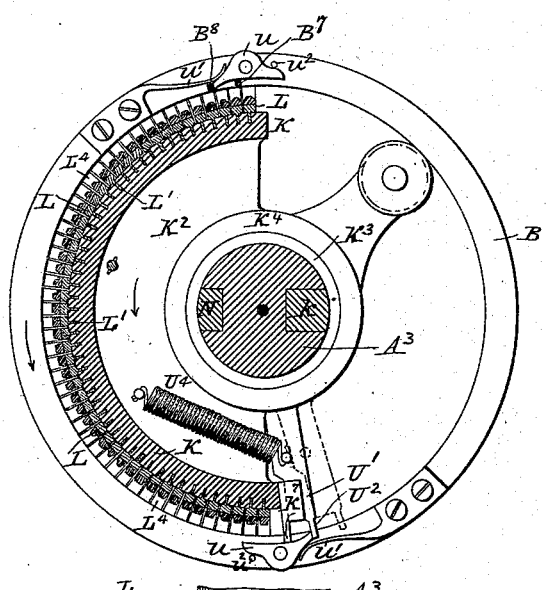
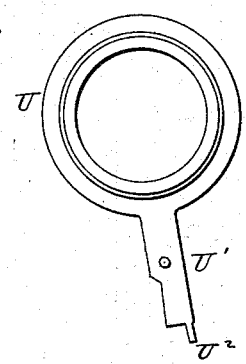
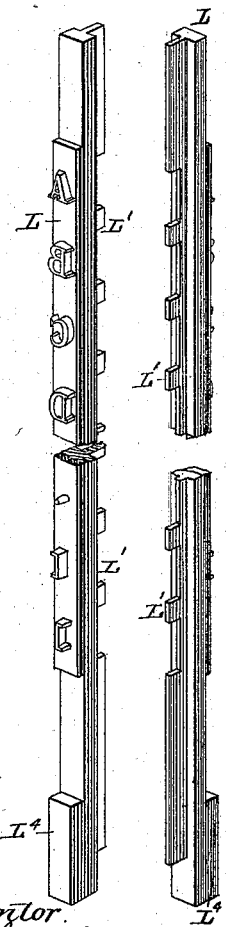
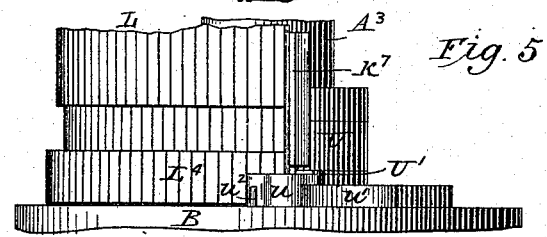
Witnesses:
Sidney P. Collingsworth
Geo. W. McInnis
Inventor
Charles Elmer Allen
by:—
T. T. F. Johnson, Atty.

(No Model.)  11 Sheets—Sheet 4.
C. E. ALLEN.
LINOTYPE MACHINE.
No. 562,563. Patented June 23, 1896.
Fig. 24. 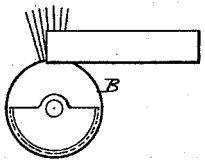  Fig. 25. 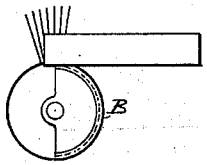  Fig. 26. 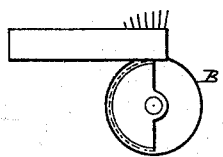  Fig. 27. 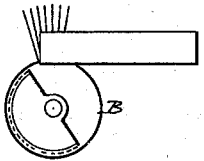

Fig. 29.
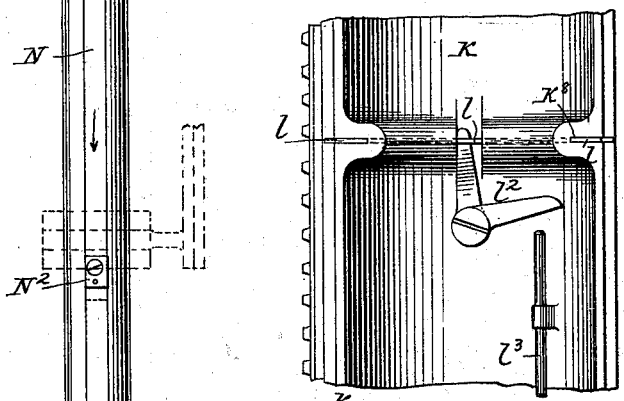

Fig. 30.
Witnesses,
Sidney P. Hollingsworth
Geo. W. Manklin
Inventor,
Charles Elmer Allen,
by T. F. Johnson, Atty.

(No Model.) 11 Sheets—Sheet 5.

C. E. ALLEN.
LINOTYPE MACHINE.

No. 562,563. Patented June 23, 1896.

Witnesses:
Sidney R. Hollingsworth
Geo. W. McMillin

Inventor:
Charles Elmer Allen
by
T. T. T. Johnson, Atty.

(No Model.)  11 Sheets—Sheet 6.

C. E. ALLEN.
LINOTYPE-MACHINE.

No. 562,563.  Patented June 23, 1896.

Witnesses,  
Sidney R. Hollingsworth  
Geo. W. Menken

Inventor.  
Charles Elmer Allen  
by  
T. T. F. Johnson, Atty.

(No Model.)    11 Sheets—Sheet 7.
C. E. ALLEN.
LINOTYPE MACHINE.
No. 562,563. Patented June 23, 1896.
Fig. 12.
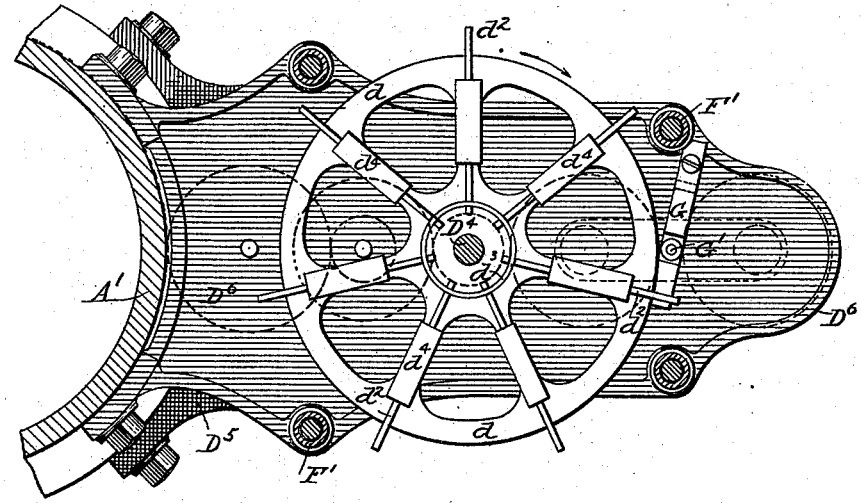
Fig. 13.
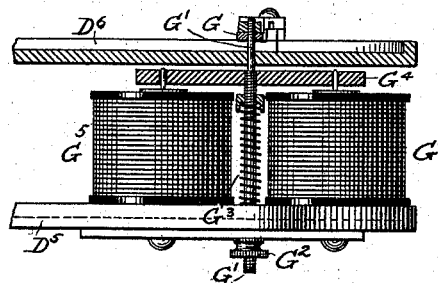
Fig. 14.
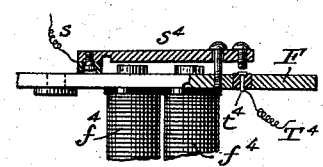
Fig. 16.
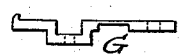
Fig. 15.
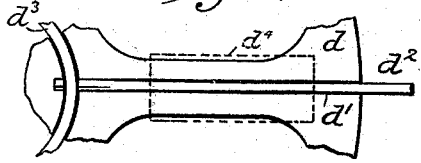
Fig. 17.
Fig. 18.
Witnesses
Sidney P. Hollingsworth
Geo. W. Mankin
Inventor
Charles Elmer Allen
by J. J. Johnson, Atty.

(No Model.) 11 Sheets—Sheet 8.

C. E. ALLEN.
LINOTYPE MACHINE.

No. 562,563. Patented June 23, 1896.

Witnesses
Sidney P. Hollingsworth
Geo. W. Menekin

Inventor
Charles Elmer Allen
by F. F. Johnson
Atty.

ANDREW B. GRAHAM, PHOTO-LITHO, WASHINGTON, D.C.

(No Model.) 11 Sheets—Sheet 9.
C. E. ALLEN.
LINOTYPE MACHINE.
No. 562,563. Patented June 23, 1896.
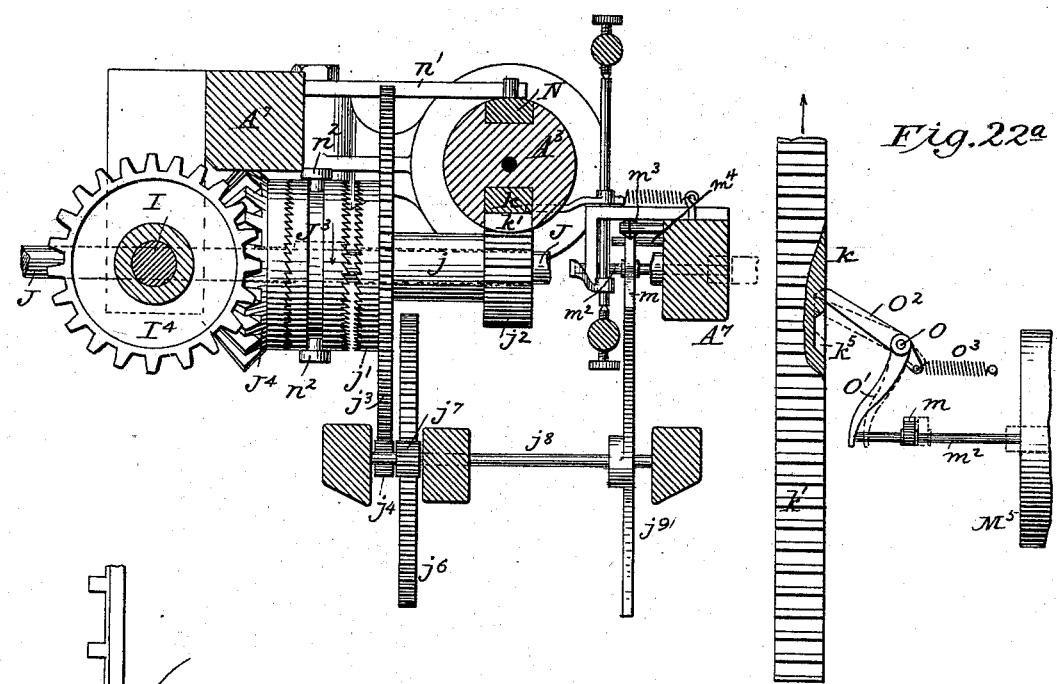
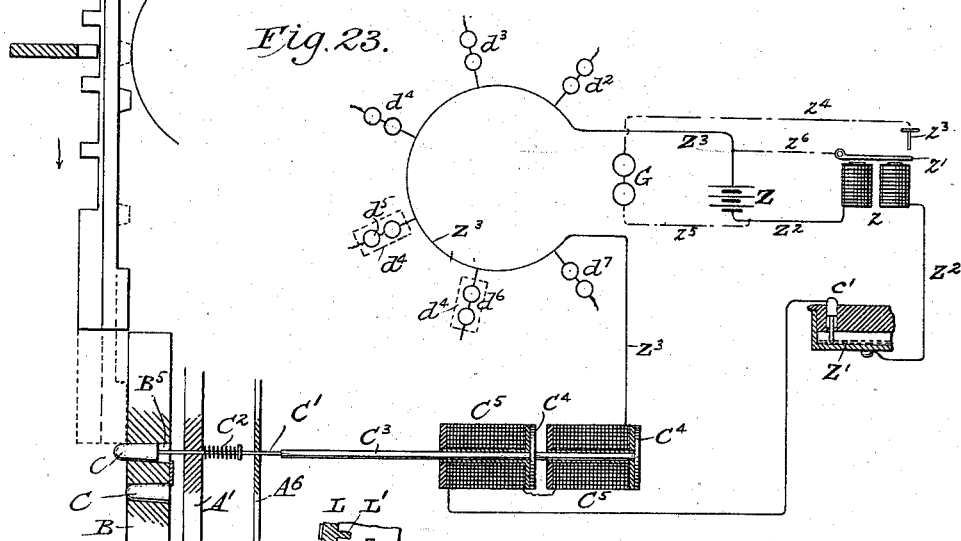
Witnesses  Inventor:

(No Model.) 11 Sheets—Sheet 10.

C. E. ALLEN.
LINOTYPE MACHINE.

No. 562,563. Patented June 23, 1896.

Witnesses:
Sidney P. Hollingsworth
Geo. W. Mankin

Inventor
Charles Elmer Allen
by T. T. Johnson, Atty.

ANDREW B.GRAHAM, PHOTO-LITHO, WASHINGTON, D.C.

(No Model.)  11 Sheets—Sheet 11.

C. E. ALLEN.
LINOTYPE MACHINE.

No. 562,563.  Patented June 23, 1896.

WITNESSES
INVENTOR
Charles Elmer Allen

UNITED STATES PATENT OFFICE.

CHARLES ELMER ALLEN, OF WASHINGTON, DISTRICT OF COLUMBIA, ASSIGNOR TO THE STENOTYPE COMPANY, OF PORTLAND, MAINE.

LINOTYPE-MACHINE.

SPECIFICATION forming part of Letters Patent No. 562,563, dated June 23, 1896.

Application filed July 24, 1895. Serial No. 550,980. (No model.)

*To all whom it may concern:*

Be it known that I, CHARLES ELMER ALLEN, a citizen of the United States, residing at Washington, District of Columbia, have invented certain new and useful Improvements in Linotype-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improved rapid-writing type-writing machine; and its object is to enable the operator to work continuously on the keys as long and as rapidly as he pleases without paying particular attention to the other parts of the machine, which in practice may be at any distance from the operator, if so desired, and which is so constructed that it will print upon paper properly spaced and lined the words which have been spelled upon the keyboard by the depression of the keys thereof.

The subobjects of the invention are, first, to provide in one machine mechanism which will automatically set up or aline a line of type from which impressions are to be taken; second, mechanism by which said composed line of type is moved to the printing-point; third, mechanism for there taking an impression from such line of type upon a sheet of paper carried by a movable and automatically-operated paper-carriage; fourth, mechanism by which after printing the composed or alined line of type is distributed; and, fifth, mechanism whereby, during the printing operation, the composing or alining devices can be continued in operation and be ready to simultaneously compose or aline a line of type, so that the operator can work continuously at the keyboard, as above stated.

Further objects of the invention are to regulate the movements of the paper-carriage so that it will automatically space the lines and return to starting position after each printing operation or completion of a printed line.

The invention further consists in the construction and combination of parts summarized in the claims; and the accompanying drawings illustrate the best form of apparatus embodying my invention now known to me, but as it is capable of much variation and modification in construction by skilled mechanics I do not confine myself thereto.

Briefly stated, the machine, as shown, consists of a rotating cylinder carrying a series of vertical rows of pins or stops which can be projected inward by suitable means, controlled by the keyboard, as they pass a certain point in the rotation of the cylinder, the pins remaining projected (if projected) until just before they again pass the projecting mechanism, when they are retracted or returned to their normal position. Above said pin-cylinder is a semicylinder carrying a series of vertically-movable type-bars, each bar carrying a complete alphabet or alphabets and proper grammatical points, or whatever other characters desired. This type-bar holder is lowered at certain intervals of time into the pin-cylinder, and the series of type-bars thereon are caught and upheld by the projected pins. Then the said type-bars are locked and the holder rises clear of the pin-cylinder and brings the alined line of type to the printing-point and then rotating therepast impresses the type upon the paper on the movable carriage which is moved past the cylinder or holder by being momentarily geared thereto. As soon as the impression is complete the carriage is released and flies back to starting-point, and is given a partial turn to present a new line at the next printing operation. The type-bars are then released and the type-bar holder descends into the pin-cylinder, where a new set of pins await and reshift the type-bars in the holder, and the operation of the device is repeated.

In the machine shown the keyboard appears as if part of the machine, but as the invention is especially designed for reporters, in practice, the machine may be placed in any position, or even in an adjoining room, if so desired, and the keyboard upon a desk in convenient position for the reporter, and each key electrically connected through a cable-strand with a pin-controlling device, so that the noise of the machine will not be disturbing, the keyboard being practically noiseless. In fact, as shown, many of the operative parts are operated by electrically-controlled devices, thus enabling the machine to be run in out-of-the-way places with certainty and safety, but I do not limit myself to electricity as the prime mover or controller of the mechanisms.

Proceeding now to the detail description of the machine the reference letters and figures herein refer to the accompanying drawings, which illustrate the machine, and in which—

Figure 1 is a vertical central section through the machine on line 1 1, Fig. 2. Fig. 2 is a plan view of carriage with cylinder-casing in section on line 2 2, Fig. 1. Fig. 3 is a detail section, looking down, on the line 3 3, Fig. 1. Fig. 4 is a cross-section on line 4 4, Fig. 1, enlarged. Fig. 5 is a detail side elevation of Fig. 4. Fig. $5^a$ is a detail view of the stop-arm shown in Fig. 4. Figs. 6 and 7 are perspective views of parts of type-bars. Fig. 8 is a detail of the main supporting-shaft and clutch-operating devices. Fig. 9 is a transverse section on line 9 9, Fig. 1. Fig. 10 is an elevation of the escapement mechanism. Fig. 11 is a plan view of the top plate on Fig. 10. Fig. 12 is a cross-section on line 12 12, Fig. 10, looking down. Figs. 13 to 18 are details of the escapement mechanism. Fig. 19 is an enlarged sectional view of the lower part of the pin-cylinder and an elevation of the lower operative mechanism of the machine. Fig. 20 is a bottom plan view of Fig. 19. Fig. 21 is a view at right angles of the parts shown in Fig. 19. Fig. 22 is an enlarged cross-section on line 22 22, Fig. 19, looking down. Fig. $22^a$ is an enlarged detail of the trip mechanism for lowering the type-bar holder. Fig. 23 is a diagram showing the cycle of operations of the mechanism of the machine. Figs. 24, 25, 26, and 27 are diagrams illustrating the various positions of the type-cylinder and paper-carriage. Figs. 28, 29, 30, and 31 are details of the locking devices of the type-bars. Figs. 32 and 33 illustrate the switch for controlling the descent of the type-bar holder. Fig. 34 is a detail view of the devices for rotating the type-holder and moving the paper-carriage. Fig. 35 is a diagram of the electrical circuits and connections in the machine. Figs. 36, 37, and 38 are details of the switch mechanism controlling the starting and stopping of the motor. Fig. 39 is a top plan view, partly broken, showing the relative arranging and position of the several parts.

From a plate A, which may be the top of a stand or other suitable support, depends a vertical cylindrical casing $A'$, slightly enlarged at its lower end and closed by a bottom plate $A^2$, centrally from which, and axially of the casing, rises a fixed shaft or support $A^3$, that extends above plate A into and axially of a cylindrical casing $a$, that rises from plate A vertically over casing $A'$.

Within casing $A'$ is the pin-cylinder B, which is slightly smaller in diameter than the casing and has a gear $B'$ on its bottom, whose hub encircles the shaft $A^3$ and has a collar $B^3$ on its lower end which runs on ball-bearings on plate $A^2$, as shown, so that the pin-cylinder is held upright and revolves easily within the casing $A'$. On the hub of gear $B'$ is loosely fitted the hub of another gear $b$, and interposed between the gears is a stout coiled spring $b'$, one end of which is fixed to a pin $B^4$ on gear $B'$, and the other end to a pin $b^2$ on gear $b$, so that when said spring is tensioned it will tend to revolve the gears oppositely. This spring is utilized for a purpose hereinafter described.

The pin-cylinder is provided with a series of vertical and horizontal rows of radial perforations $B^5$ in which are placed pins C, the latter being confined in the holes in any suitable manner, so that they can not escape therefrom, nor project outward, but may be projected inward, as indicated in Fig. 23. At one side of the pin-cylinder (see Figs. 1, 9, and 23) are several vertical rows of push-pins $C'$, these rows being the same distance apart as the rows of pins in the cylinder B, and there being as many push-pins in a vertical row as there are pins C in a vertical row in the cylinder. These push-pins are supported in perforations in the side of the casing $A'$ and in a plate $A^6$, fastened to one side of the casing in such position that when any push-pin is moved inward it will project a correspondingly-located pin in the adjoining row of pins in the cylinder B, which is intermittently rotated so as to always bring unacted upon rows of pins into register with the rows of push-pins. The push-pins $C'$ are normally retracted or held out of the way of the cylinder B and its pins by the springs $C^2$, as indicated in the drawings, but are moved inward by rods $C^3$, attached to the armatures $C^4$ of electromagnets $C^5$, which are energized by currents of electricity from a battery Z when the corresponding key of the keyboard is depressed. In practice each push-pin has an independent solenoid or magnet to operate it, and each key on the keyboard controls one particular push-pin. Therefore, each key has a separate electrical connection with the magnet of the corresponding push-pin, but a common return may be used for each series of push-pin magnets to the battery. As shown, I have indicated seven rows of keys $c'$, $c^2$, $c^3$, $c^4$, $c^5$, $c^6$, and $c^7$ on the keyboard, (the keyboard designed for use with this machine is shown and described in a patent for an electrical keyboard dated March 27, 1894, No. 517,402,) each row controlling a series of push-pins. Each pin has a direct connection by a wire with its corresponding push-pin magnet, and below the series of keys is a common contact $Z'$, electrically connected with the positive pole of the battery, so that when any key is depressed it contacts $Z'$ and closes circuit through the magnet corresponding to the key depressed, which actuates the corresponding push-pin and causes it to project a pin in a row in the pin-cylinder B, which pin at the proper time will arrest a type-bar in such position that the letter thereon corresponding to the key depressed will be printed at the next printing operation of the machine. As shown, I have arranged two magnets tandem with their armatures connected to a common core or rod. This gives a very quick-acting device, and as soon as the current is broken the core or rod will be thrown back by the retraction of the displaced push-pin $C^2$. (For a detail description of the pin-actuating magnets and their arrangement reference is made to my application for improvements in banks of electro-magnets, filed on or about October 28, 1895, Serial No. 567,107.)

The pin-cylinder is rotated or revolved by coiled spring $b'$, which is wound up automatically, as hereinafter described, and the movement of the pin-cylinder is controlled by an escapement mechanism, hereinafter described, (for a more particular description in detail of the said mechanism reference is made to my application for improvements in escapement mechanisms, filed on or about the 28th day of May, 1894, Serial No. 512,656,) and shown best in Figs. 9 to 18, inclusive. The gear $B'$ on the bottom of the pin-cylinder B meshes through a slot in the side of the casing $A'$ with a pinion D, which is the first of a train of reducing-motion gears D, $D'$, $D^2$, and $D^3$, mounted on suitable shafts journaled in bracket-plates $D^5$ $D^6$, secured to the side of the casing $A'$, Fig. 10. The shaft $D^4$ of gear $D^3$ extends above plate $D^6$, and on it above said plate is a disk $d$, Fig. 12, which has seven equidistant radial slots $d'$ in it, in each of which slots is mounted a latch $d^2$, which latches are confined in the slots by an annulus $d^3$ engaging slots in their inner ends, which ends are split, as shown in Figs. 15 and 18, so as to bind in the slots with sufficient friction to hold the latches up, when lifted, unless forcibly depressed. The outermost latch $d^2$, i. e., that farthest from the casing $A'$, is engaged by a catch G, hereinafter described, so as to lock the disk and through the connected gearing the pin-cylinder B until the catch is depressed and the latch is permitted to escape, as is evident.

Above disk $d$ is a plate F, (see Figs. 10 and 11,) supported on posts $F'$, attached to plates $D^5$ $D^6$. From this plate F depend six pairs of electromagnets $f^2$, $f^3$, $f^4$, $f^5$, $f^6$, and $f^7$, one pair directly over each of the latches $d^2$, except over the outermost latch, i. e., that engaged by the catch G. Each latch $d^2$ carries an armature $d^4$, so that it may be attracted to the magnet immediately above it when the latter is energized. Of course the magnets are stationary, but disk $d$ will be always locked by catch G in such position that a latch underlies each magnet. A roller $F^7$ is fixed on the lower end of a stud $F^8$, depending from the plate F in such position that if any latch should pass catch G in a raised position it will be depressed before it passes under any magnet. Catch G, which lies on top of plate $D^6$, is connected to a rod $G'$, that passes through both plates $D^5$ $D^6$, and has an adjusting-nut $G^2$ on its lower end by which the upward throw of the catch can be nicely adjusted, a spring $G^3$ on said rod always tending to throw the catch upward. Upon rod $G'$ is also fastened a cross-bar $G^4$, which forms the armature of a pair of electromagnets $G^5$, mounted on plate $D^5$, Figs. 10 and 13. Consequently when magnets $G^5$ are energized catch G is disengaged from latch $d^2$ and the pin-cylinder begins to rotate until catch G engages another latch $d^2$. The magnet $G^5$ is interposed in a shunt-circuit between the battery Z and the common contact $Z'$ of the keyboard, which is momentarily closed after the depression and release of any key on the keyboard, thereby energizing said armature and causing it to momentarily depress catch G and release latch $d^2$ and allow the pin-cylinder to rotate more or less, according to which row of the keyboard the key depressed may be in. As the electrical connections between the keys and the electromagnetic devices would be too intricate or confusing to illustrate assembled, as they appear practically, I have diagrams, Figs. 23 and 35, and also a figure, Fig. 39, made for the purpose of explaining this part of the invention.

In Fig. 35 the seven rows of keys are illustrated by the seven keys $c'$, $c^2$, $c^3$, $c^4$, $c^5$, $c^6$, and $c^7$, each of which may be taken as any one of the keys in the row it represents. The seven magnets respectively represent any one of the series which actuate the push-pins. The common contact $Z'$ is connected by wire $Z^2$ to the battery Z, and a magnet $z$ is interposed in the circuit between the contact and battery, and the wires $Z^3$ leading from the positive pole of the battery connects in multiple with the row of magnets $C^5$ that are electrically connected to the first row of keys $c'$ in the keyboard. One terminal of each of the magnets $f^2$ $f^3$ $f^4$ $f^5$ $f^6$ $f^7$, respectively, is connected by independent wires to the series of magnets $C^5$ belonging to the respective series of keys $c^2$ $c^3$ $c^4$ $c^5$ $c^6$ $c^7$, as shown, and their other terminals are connected to wire $Z^3$, as shown. The armature $z'$ of magnet $z$ is connected by a shunt-wire $z^6$ to the positive pole or wire of battery Z, and it rests on a spring $z^2$, which is compressed when the magnet attracts the armature, and, when the armature is released, by the breaking of the circuit through the magnet, throws the armature $z'$ upward sufficient to cause it to momentarily strike a contact-point $z^3$, which is connected by a wire $z^4$ with one terminal of the magnet $G^5$, the other terminal of which is connected by a wire $z^5$ with the negative pole or wire of the battery Z.

By reference to Fig. 35 it will be found that when key $c'$ is depressed an electric circuit is established through said key, its corresponding magnet $C^5$, and magnet $z$, actuating the proper push-pin, while the pin-cylinder is of course at rest, because a latch $d^2$, which controls the movement of said pin-cylinder, is locked by catch G. The passage of a current through magnet $z$, however, attracts armature $z'$ and tensions spring $z^2$, and, the instant the current through $z$ is broken by the release of the key $c'$, armature $z'$ is thrown upward momentarily contacting $z^3$, from which it immediately drops by gravity, sending a current through magnet $G^5$, which causes catch G to disengage the latch $d^2$ which was in contact therewith, but allows it to fly back into position to catch the next latch that may be depressed. When a single key $c'$ is alone depressed, the disk $d$, carrying latches $d^2$, would make only a one-seventh of a revolution and the pin-cylinder would move one row of pins or stops, or one notch before being arrested.

The object of using the shunt-current to release catch G is to prevent the pin-cylinder moving while the push-pins are projecting the pins therein, and it will be readily understood from the foregoing that the push-pins will operate before the catch is released, though in an immeasurably short time.

In the practical operation of the machine the operator must always begin on the first row of keys, or keys controlling the first row of push-pins (that at the left-hand side of the cylinder if the said cylinder rotates to the left) and must depress them successively in the order of the letters which spell the words to be recorded. If, however, he has a word of two or three letters, as "at" and "the," for instance, he may simultaneously depress the "a" key in the first row and "t" key in the second row, and the "t" key in the fourth row, "h" key in the fifth row and the "e" key in the sixth row, whereupon the proper push-pins in the first, second, fourth, fifth, and sixth rows will be projected, projecting the corresponding pins in the pin-cylinder, and the said pin-cylinder will rotate six notches, as hereinafter described. It will be noted in this connection that when it is desired to space between words, a row of keys on the keyboard is passed over, so that there will not be a push-pin, or corresponding pin in the cylinder thrust forward, but a space will be left as a result of passing over the row of keys, as is evident, so that the letters of words of seven letters or less may be simultaneously depressed, provided that for the first letter of the word a key in the first row is depressed, for the second letter a key in the second row, &c. Practically, word-keys may be placed on the keyboard, so that upon the depression of a word-key push-pins will be operated in proper order for the selection of the word. It is to be further noted in this connection that while I have described a keyboard having but seven rows of keys and seven rows of corresponding magnets, and an escape with seven latches thereon, I do not limit myself to that number, as it is evident that the number of rows, &c., can be increased as desired, without departing from the spirit of my invention. When a key $c'$ in the first row is depressed, the disk $d$ makes a one-seventh of a revolution only, and the pin-cylinder rotates but one notch. If a key $c^2$ in the second row is depressed, the pin-cylinder rotates two notches. The cylinder rotates three notches when a key in the third row is depressed, and so on up to seven notches when a key in the seventh row is depressed. In order to enable the cylinder to do this, it is necessary that key $c^2$ control magnet $f^2$, key $c^3$ control magnets $f^3 f^2$, key $c^4$ control magnets $f^4 f^3 f^2$, key $c^5$ control magnets $f^5 f^4 f^3 f^2$, key $c^6$ control magnets $f^6 f^5 f^4 f^3 f^2$, and key $c^7$ control magnets $f^7 f^6 f^5 f^4 f^3 f^2$. From this it will be seen that each magnet controls every preceding magnet. Magnet $z$ is of course energized upon the depression of any key in any row. Consequently magnet $G^5$ is energized indirectly after the depression of any key. The keys in the respective rows are enabled to control the magnets, as described, by the following means: Over each magnet $f^3$, $f^4$, $f^5$, $f^6$, and $f^7$ is an insulated spring $s^3$, $s^4$, $s^5$, $s^6$, and $s^7$, respectively, which form secondary armatures for the magnets, and when the magnets are energized will be drawn into contact with insulated contact-points $t^3$, $t^4$, $t^5$, $t^6$, and $t^7$, respectively. Each spring $s^3$, $s^4$, $s^5$, $s^6$, and $s^7$ is electrically connected with a wire $s$, which connects with wire $z^5$. (See Fig. 35.)

Contact $t^3$ is connected by a wire $T^3$ with the return-wire from magnet $f^2$, contact $t^4$ by a wire $T^4$ to the return-wire from magnet $f^3$, contact $t^5$ by a wire $T^5$ with return-wire from magnet $f^4$, contact $t^6$ to a wire $T^6$ to return-wire from magnet $f^5$, and contact $t^7$ by wire $T^7$ to return-wire from magnet $f^6$. Therefore, if contact be made between spring $s^3$ and point $t^3$ (by energizing magnet $f^3$) a current is instantly shunted from wire $Z^3$ through magnet $f^2$, wire $T^3$, point $t^3$, spring $s^3$, and wire $s$ to the battery Z, the magnet $f^2$ being also energized, thus the latches $d^2$ underlying the magnets $f^2 f^3$ will be raised upon the depression of any key $c^3$, and, as magnet $G^5$ is also energized upon the release of said key, the disk $d$ will rotate three-sevenths of a revolution, not stopping until the latch $d^2$, which at the moment of starting lay under magnet $f^4$, strikes against catch G, for the two latches which lay under the magnets $f^2 f^3$ will be raised thereby, and will remain in a raised position until after they have passed over the catch G, but will be pressed down into position again after they have passed the catch by a roller or slicker $F^7$, as is apparent.

If any key $c^7$ were depressed, the current would pass directly through magnet $f^7$, which would cause spring $s^7$ to contact with point $t^7$, and a shunt-current would flow through magnet $f^6$, energizing it, and it in turn would shunt a current through magnet $f^5$, which would shunt a current through magnet $f^4$, which in turn would shunt a current through magnet $f^3$, and this magnet $f^3$ would shunt a current through magnet $f^2$, as described. Thus, if only a key $c^7$ were depressed, the disk $d$ would make a complete revolution, and a partial revolution of greater or less extent for any key depressed, according to the row on the keyboard in which it is located.

As before stated, in practice, the operator should only work on the first row of keys $c'$, except when he desires to strike an entire word or phrase at once. When he does strike an entire word, say by depressing four keys on the first four rows of the keyboard, currents would be taken directly through magnets $f^2$, $f^3$, and $f^4$, irrespective of the shunt-currents and the proper push-pin magnets $C^5$ of the four keys would be also energized; but if only the fourth key $c^4$ were depressed its push-pin magnet $C^5$ and magnet $f^4$ would be directly in circuit, but magnets $f^2$ $f^3$ would be energized by shunt-currents and raising the latches $d^2$ thereunder so as to pass over the top of the catch G, so that upon the disengagement of the catch G from a latch $d^2$ the pin-cylinder, which is operated or controlled thereby through a properly-arranged train of gears, would turn or move four notches. There are various practical advantages of this system of keying the apparatus which it is unnecessary to describe here, as sufficient has already been explained to make the practical operation clear.

*Mechanism for winding spring $b^2$.*—Gear $b$ meshes with a pinion $I^5$ on a vertical shaft I, journaled in suitable bearings exterior to the cylinder $A'$ and the cylinder $a$, and driven by a bevel-gear $I^4$ on its lower end meshing with a bevel clutch-gear $J^4$ on a horizontal shaft J, journaled in brackets $A^7$ below the bottom plate $A^2$ of the cylinder $A'$. Shaft J is the main driving-shaft of the machine and is intermittently rotated, preferably by an electric motor, (indicated at $J^9$ in the drawings, Fig. 1.) The gear $J^4$ is loose on shaft J, but can be locked thereto by a clutch-collar $J^3$, splined on the shaft and which can be shifted into or out of engagement with gear $J^4$, as hereinafter described, and when gear $J^4$ is locked to shaft J shaft I will be rotated and the spring $b'$ wound up.

*The type-bar holder.*—The type-bar holder is a semicylinder which can easily enter the casing $a$ or pin-cylinder B, and is about twice as long as the said pin-cylinder, and is kept in upright position by and guided on shaft or support $A^3$ by means of yokes $K'$ $K^2$ at its upper and lower ends. The upper yoke $K'$ rests on ball-bearings $k^3$ on a collar $k^2$, slidably fitted on shaft $A^3$ and rigidly fastened to a bar $k$, which is neatly fitted in a vertical channel in shaft $A^3$, so that its outer surface is flush with the surface of said shaft. In the outer face of said holder are a number of vertical channels, in each of which is placed a type-bar L, having on its outer face types for each letter of the alphabet and ordinary punctuations arranged one above the other in any predetermined sequence. Each bar is constructed alike and has a lug $L^4$ on its lower end adapted to contact with the pins in the pin-cylinder, and has also projecting from its inner face a series of teeth $L'$, adapted to be engaged by a locking device, which will hold the bars in any position to which they may have been shifted in their grooves. This locking device consists of a curve plate or semiring (see Figs. 1, 3, 28, and 31) placed in a horizontal groove $K^8$ in holder K, about midway of the length thereof, and is provided with teeth $l'$ on its periphery which can be caused to lock the type-bars (as indicated in Fig. 3) by partly turning the plate or ring forward, or can be disengaged therefrom by turning the ring back. The ring or plate can be shifted by means of a bell-crank lever $l^2$, pivoted in the holder just below the ring or plate, the vertical arm of said lever entering a slot in the ring or plate, so as to move it when the lever is moved, and the horizontal arm of the lever is adapted to contact with a vertically-movable rod $l^3$, which is suitably guided in lugs or brackets attached to the inside of the holder and is so long that when the holder is lowered into the pin-cylinder the rod strikes the bottom of the latter and is caused to engage and rock lever $l^2$ and cause it to lock the type-bars in the grooves of the holder. After the holder has been elevated and the printing has been finished, as hereinafter described, the horizontal arm of lever $l^2$ passes (as the holder rotates) under an arm $l^4$, fixed to shaft $A^3$ at a proper point, and is thereby depressed, so as to shift the ring or plate back to its original position and release the type-bars. The lower portion of the sliding bar $k$ is provided with a rack $k'$, which meshes with a pinion $j^2$ on a sleeve $j$, mounted on shaft J and having a clutch $j'$ on its other end adapted to be engaged with clutch $J^3$ when the latter is thrown out of engagement with clutch-gear $J^4$. By this means the type-holder can be raised and lowered in the cylinders $a$ and B, as is evident. The holder is lowered by its own weight when clutch $J^3$ is disengaged from clutch $j'$, and is raised by the motor when clutch $J^3$ is engaged with the clutch $j'$ and the motor-circuit is closed, as hereinafter described. On sleeve $j$ is a gear $j^3$, meshing with a pinion $j^4$ on a shaft $j^5$, (journaled in brackets attached to or depending from plate $A^2$,) and a gear $j^6$ and a shaft $j^5$, meshing with a pinion $j^7$ on a shaft $j^8$, (also journaled in brackets beneath plate $A^2$,) on which is a fly-escapement $j^9$, which can be locked by a stop $m$, fixed on a longitudinally-movable rod $m^2$, guided in suitable brackets, the stop being kept from rotating by a pin $m^4$ and a spring $m^3$, when constructed as shown in the drawings, but it is obvious that the construction herein shown can be readily varied, and I therefore do not care to be understood as confining myself to the construction shown and described.

Another bar N is fitted into a longitudinal groove in shaft $A^3$ opposite bar $k$, and has two stops $N'$ $N^2$, fastened to it in position to be alternately engaged by yoke $K^2$ when the type-bar holder reaches it highest and lowest positions, respectively, and shift bar N longitudinally in its groove or channel in the shaft or support $A^3$. The lower end of bar N, below cylinder $A'$, engages with an arm $n'$ on a rock shaft $n$, journaled in proper bearings below and transversely of clutch $J^3$, (see Figs. 8, 20, and 22,) and to said shaft $n$ is attached the bifurcated clutch-shifter $n^2$, which engages clutch $J^3$. Thus, as the type-bar holder reaches the end of its upstroke it shifts bar N and causes it to throw clutch $J^3$ out of engagement with clutch-gear $J^4$, but when the said type-bar holder reaches the end of its downstroke it shifts bar N, and causes clutch $J^3$ to disengage clutch $J^4$ and engage clutch $j'$. Now, if clutch $J^3$ is disengaged from clutch $j'$, and the stop $m$ be disengaged from fly $j^9$, there will be nothing to prevent the descent of the type-bar holder and it will drop into the pin-cylinder, the speed of descent being governed by the train of gearing connecting sleeve $j$ with fly $j^9$, as is evident.

Yoke $K^2$ has a bushing $K^3$, which fits neatly around the shaft or support $A^3$, the said bushing being secured in the said yoke by suitable means. The yoke can rotate on this bushing with less friction than if it rotated directly on the shaft or support $A^3$, which bushing may be slotted or grooved, if necessary, to accommodate the bars $k$ and N, or rack $k'$.

In order to better understand the operation of the mechanism which controls the movement of the type-bar holder, the movements of the said holder should be clearly understood. In the first place the said type-bar holder has both a rotary motion and an endwise movement, i. e., it is alternately lowered into and raised out of the pin-cylinder once during each of its rotations, but it is lowered into and raised clear out of the said pin-cylinder during one-fourth of a revolution thereof.

Fig. 24 is a diagram showing the relative positions of the type-bar holder and paper-carriage when the holder is ready to descend into the pin-cylinder.

Fig. 25 shows the position of the holder with reference to the paper-carriage, just after it has risen from the pin-cylinder, in which interval it has made but a one-fourth revolution.

Figure 1:
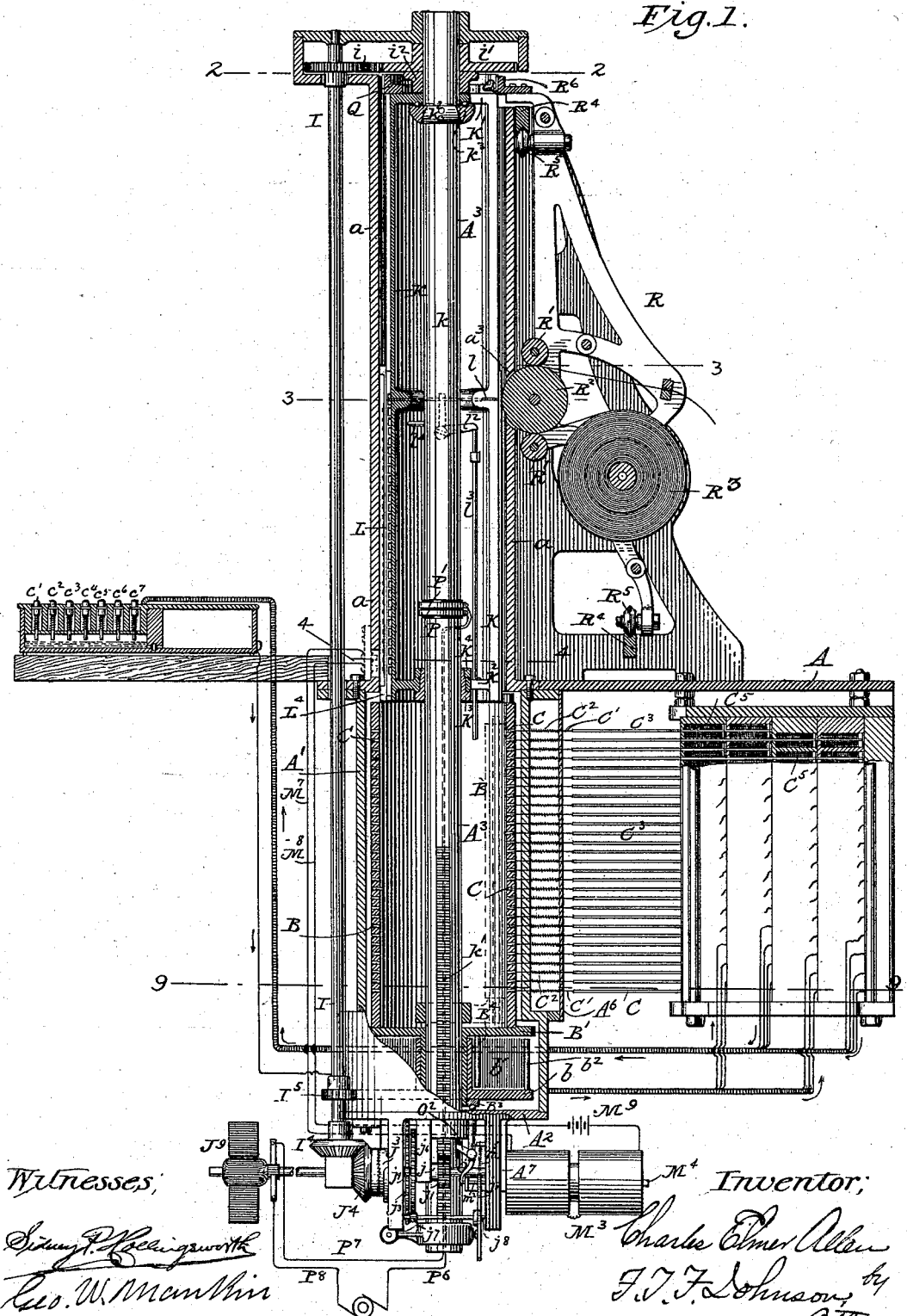
Figure 8:
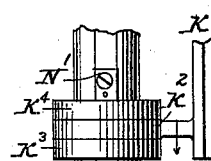
Figure 28:
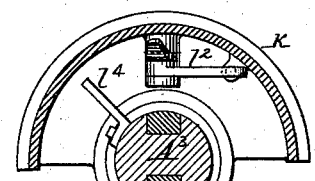
Figure 32:
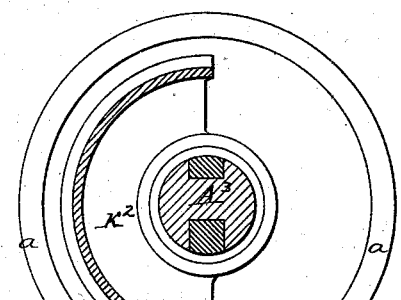
Figure 33:
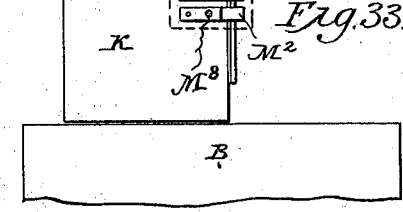
Figure 9:
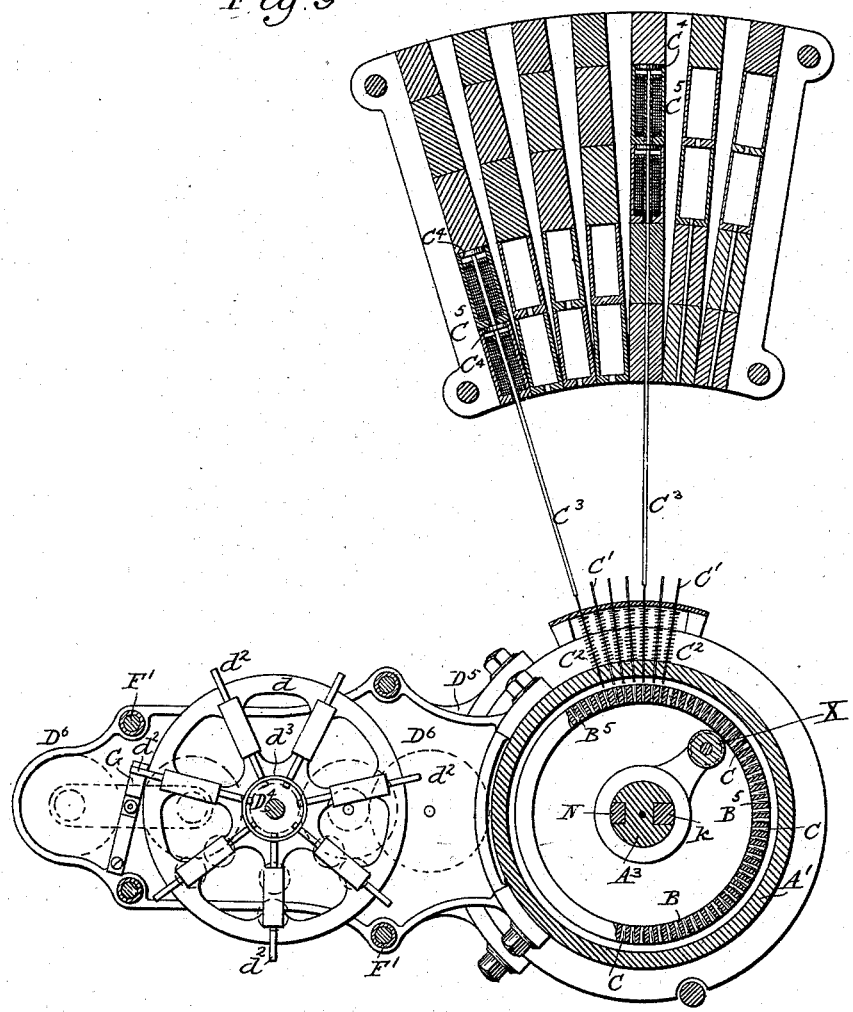
Figure 10:
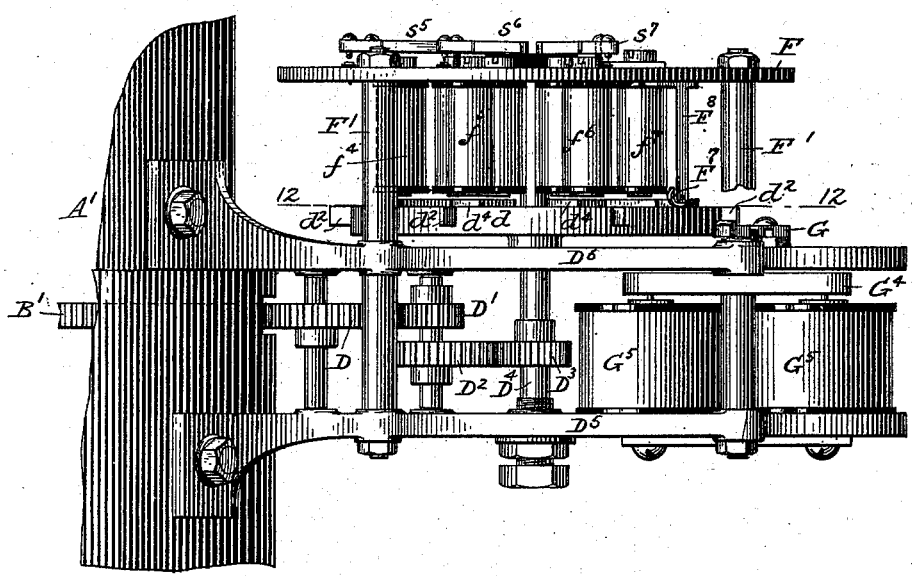
Figure 11:
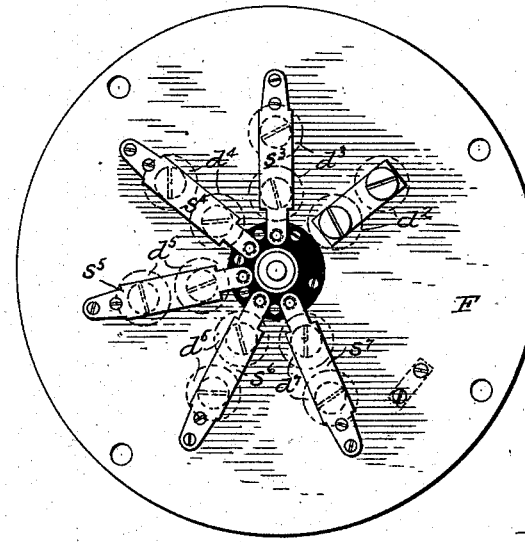
Figure 19:
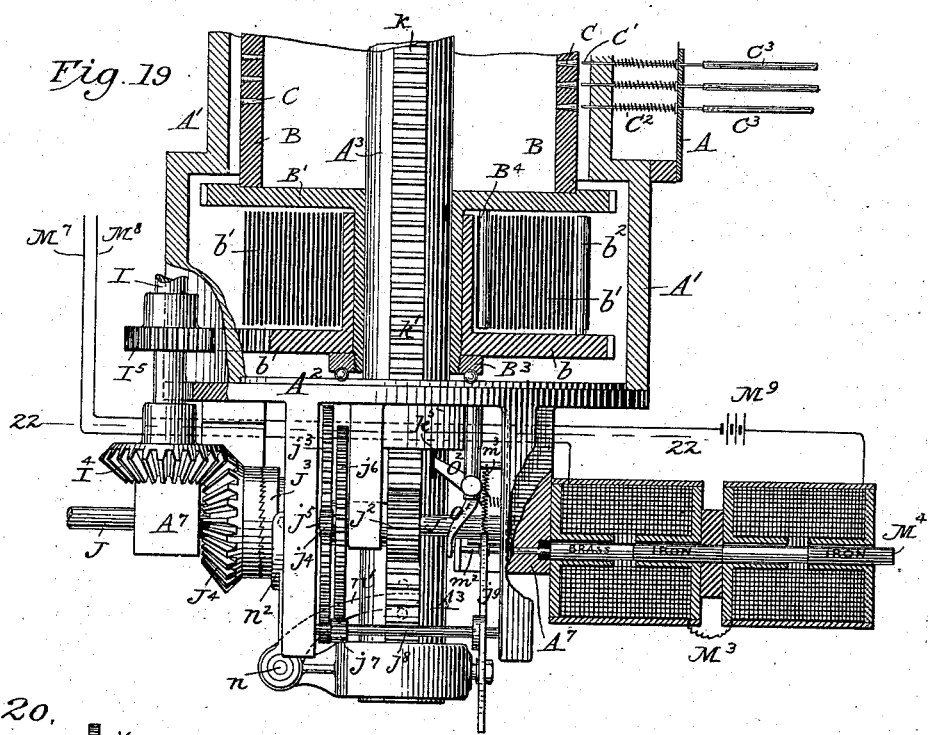
Figure 20:
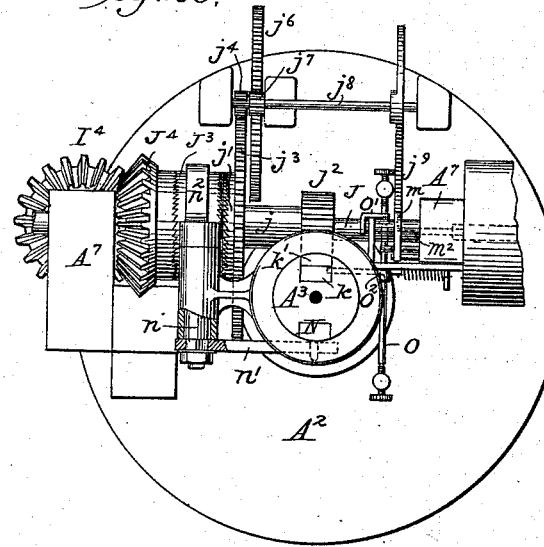
Figure 21:
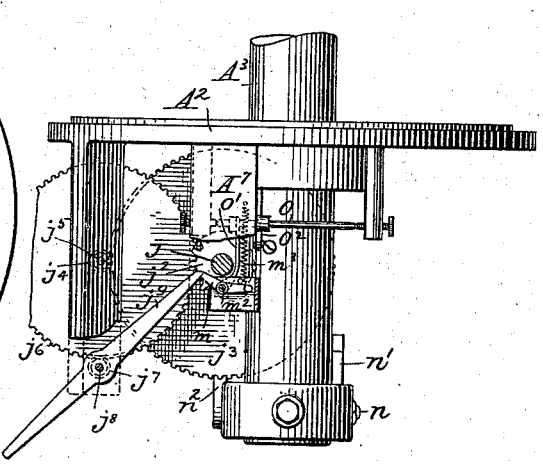
Figure 35:
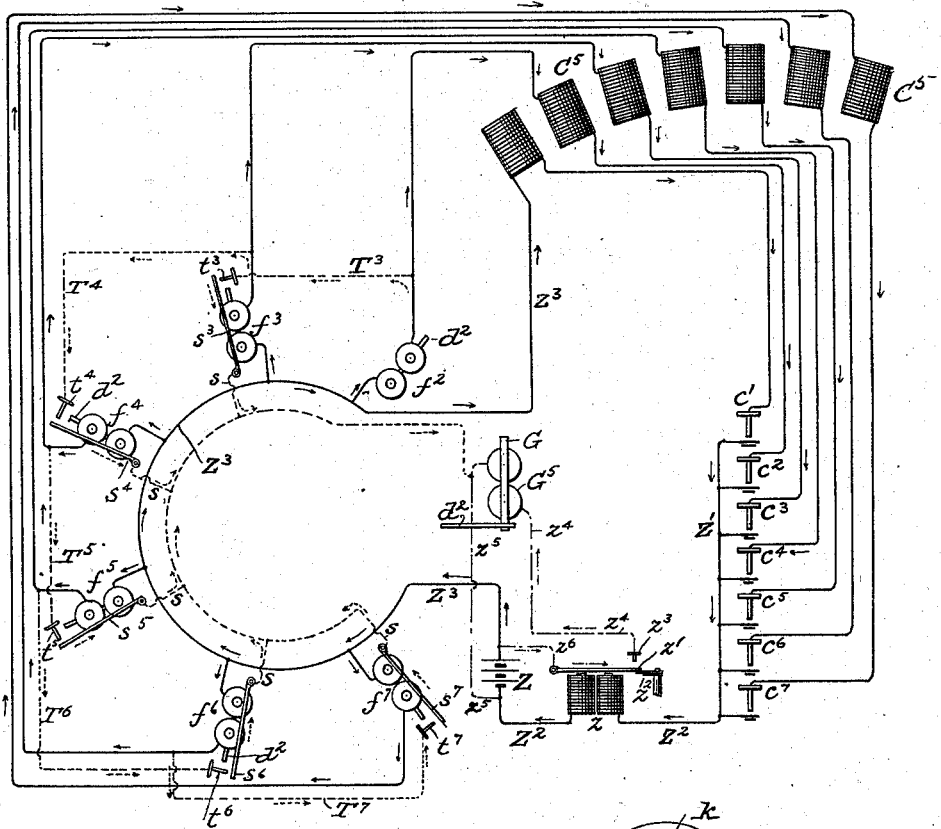
Figure 36:
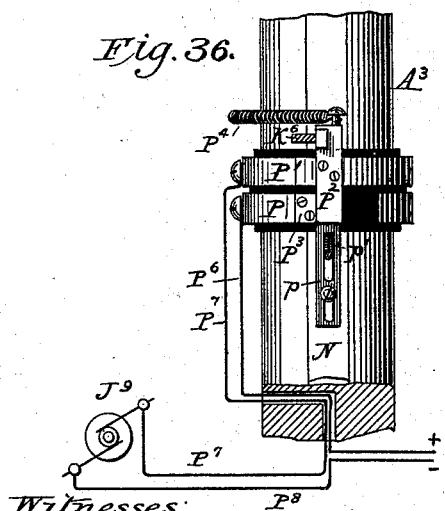
Figure 37:
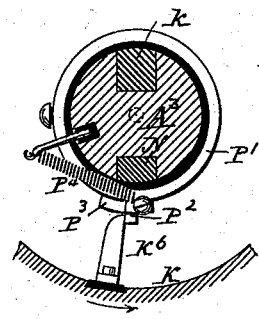
Figure 38:
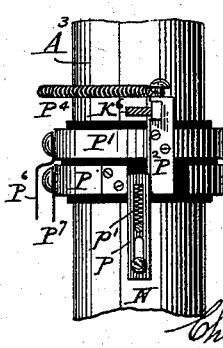
Figure 39:
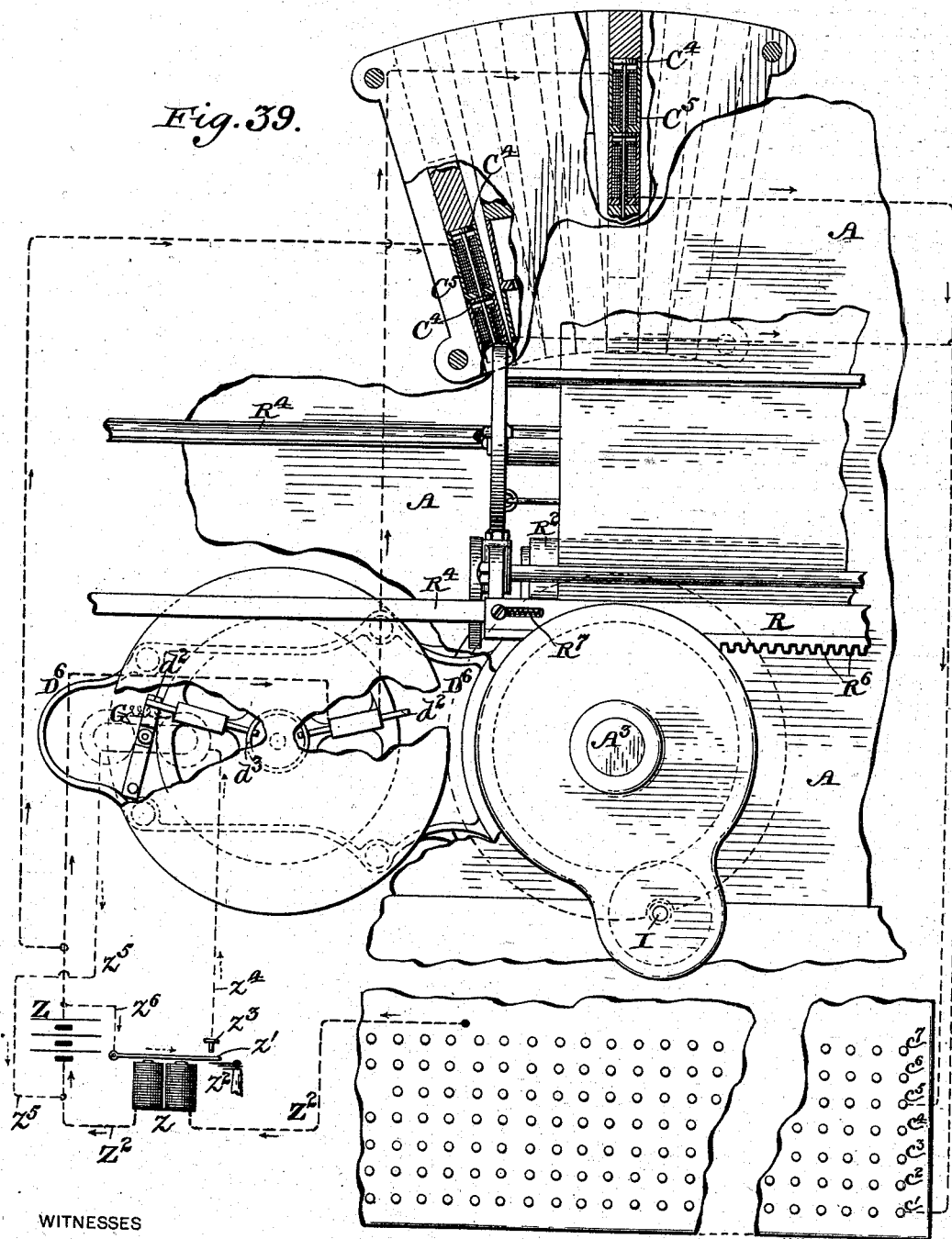

After the holder has finished printing a line and reached the position indicated in Figs. 24 and 32 an electric-circuit closer on the lower end of the holder closes an electric circuit between two contacts $M'$ $M^2$, which are connected by wires $M^7$ $M^8$ to the opposite poles of a battery $M^9$ or Z or other source of electricity, and the current flows through a tandem solenoid $M^3$, having a compound core $M^4$, which is moved inward, and its projecting end strikes against rod $m^2$ and pushes stop $m$ out of engagement with fly $j^9$, releasing the holder, which thereupon descends into the pin-cylinder until its yoke $k^2$ strikes lug $N^2$ and moves bar N, causing clutch $J^3$ to engage clutch $j'$, and simultaneously the current is switched into the motor $J^9$, as hereinafter described, and the shaft J rotated so as to drive pinion $j^2$ and raise the holder out of the pin-cylinder up into the cylinder $a$ until yoke $K^2$ strikes lug $N'$ and causes bar N and rock-arms $n'$ $n^2$ to throw the clutch $J^3$ out of engagement with clutch $j'$ and into engagement with clutch-gear $J^4$. Just as the holder starts upward stop $m$ is thrown back into position to engage fly $j^9$ by the following or other suitable mechanism: A short rock-shaft O is journaled in suitable bearings above and transversely of rod $m^2$, and on said rock-shaft is an arm $O'$, which is adapted at the proper time to strike the rod $m^2$ and push said stop $m$ and the core $M^4$ of the solenoid $M^3$ back to the original position, so that the stop $m$ will engage and lock the fly $j^9$, and thus keep the holder K raised when the clutch $J^3$ is disengaged from the clutch $j'$ until stop $m$ is moved inward by the core $M^4$, as described. On the shaft O is another arm $O^2$, which enters a slot or recess in the side of shaft or support $A^3$ and presses against the edge of bar $k$. In said edge near the bottom of the bar is a notch $k^5$, which, when the bar is in its highest position, registers with the slot or opening in the shaft or support $A^3$, and into which notch $k^5$ the end of the arm $O^2$ drops when the holder (and bar) reaches its highest position, thereby rocking shaft O and causing the arm $O'$ to push the stop $m$ into position to engage fly $j^9$, as described. The rocking of the shaft may be insured by a spring $o^3$ or any other suitable means. When the holder K and the lifting-bar $k$ therefor are about to descend, the rod $m^2$ is projected forward by the solenoid-core $M^4$, throwing the stop $m$ on said rod $m^2$ out of engagement with the fly and at the same time thrusting the end of arm $O'$ toward the shaft $A^3$, rocking shaft O and causing arm $O^2$ to be thrown up out of the notch $k^5$, and the bar, being thus released, will descend, carrying the holder down into the pin-cylinder B, as is evident.

The switch for throwing the motor into and out of action is as follows: P P' are two conductor-rings on shaft $A^3$, but insulated from said shaft and from each other, as shown. The upper ring P' is movable and to it is attached a contact-piece $P^2$, adapted to contact with a piece $P^3$ on ring P and establish a circuit therebetween so long as the parts remain in contact. A suitable insulated spring $p^4$ is attached to ring P' and the shaft $A^3$, or a stud projecting therefrom, and always tends to keep pieces $P^2$ and $P^3$ in contact. As the holder reaches the positions shown in Figs. 4 and 24, an insulated arm $K^6$, attached to and projecting from the inner side of the holder, contacts with piece $P^2$ and moves it away from piece $P^3$ sufficient to allow a spring-actuated insulated dog $p$, attached to bar N, to spring between the pieces $P^2$ and $P^3$ and keep them out of contact, thereby breaking the circuit through the motor, for rings P and P' are connected to wires $P^6$ and $P^7$, which pass down through an opening in the shaft $A^3$, as shown, the wire $P^6$ connecting with a dynamo or other source of electricity (not shown) and wire $P^7$ to the opposite binding-post of the motor, the other binding-post of which is connected to the return-main by a wire $P^8$. When the holder reaches its lowest position and shifts bar N downward, it draws dog $p$ from between pieces $P^2$ and $P^3$, which are then drawn into contact by the spring $P^4$, closing the circuit through the motor, which thereupon (clutch $J^3$ being shifted into engagement with clutch $j'$) raises the holder, as described. When the holder reaches its uppermost position and pulls bar N upward, throwing clutch $J^3$ out of engagement with clutch $j'$ and into engagement with clutch-gear $J^4$, as described, the current is not cut off, because while dog $p$ is raised it cannot pass between the pieces $P^2$ $P^3$, and is held down, yieldingly, so as not to injure the pieces $P^2$ $P^3$, and tensioning its spring $p'$, which holds the dog in readiness to jump between the pieces $P^2$ $P^3$ as soon as they are separated by the arm $K^6$, which does not occur until the holder has made a half-revolution in its elevated position. Then the motor is cut out and the holder descends, as described. During the time the holder remains in its elevated position, and the motor running, shaft I is of course positively driven by the clutch $J^3$, clutch-gear $J^4$, and bevel-gear $I^4$, and winds up spring $b^2$ and at the same time rotates the holder and moves the paper-carriage to print, as follows: On the upper end of the shaft I is a pinion $i$, meshing with a gear $i'$, loosely mounted on shaft $A^3$ and supported on a collar $i^2$, fixed thereon just above the top of the holder when it is in its highest position. To the under side of gear $i'$ is attached a stud or tooth $i^3$, adapted to engage a recess or channel $Q'$ in the upper side of a segmental gear Q, attached to top of holder K, as shown, and these devices are so proportioned and arranged that when the holder reaches its highest point and is freed from the pin-cylinder, pin $i^4$ will engage gear Q and continue the rotation of the holder, clutch $j^3$ having just disengaged clutch $j'$ and engaged clutch-gear $J^4$. The segment Q meshes with a rack $R^6$ attached to a paper-carriage R. This rack is permitted a slight longitudinal movement, but is held in place by springs $R^7$, the object of which is to prevent the teeth on gear Q and $R^6$ breaking if they should not properly register by allowing the rack $R^6$ to slip forward until its teeth register with the gear.

The carriage R is guided by wheels $R^5$ on horizontal rails $R^4$, lying transversely of cylinder $a$, and is provided with a paper-roll or sheet-holder $R^3$, a platen $R^2$, and guide and clamp rolls $R'$ $R'$, as indicated in the drawings. The platen $R^2$ lies opposite a slot $a^3$ in cylinder or casing $a$ and projects sufficiently inward to contact with the type on the type-bars L, mounted on the type-bar holder, as the said holder rotates past said slot or opening. By this means the carriage is carried forward past the opening at a speed uniform with the rotation of the holder and takes an impression from such types on the type-bars as are horizontally in line with the platen, and if the types are properly alined to spell words the result will be a complete line of reading-matter printed at each operation of the platen. As soon as the line is printed gear Q passes out of engagement with rack $R^6$ and the carriage R is quickly returned to the starting-point by any suitable means, as by a cord and weight, as indicated in the drawings, and as it is drawn back the platen is automatically turned sufficiently to bring a clear portion of the paper in position for printing by the well-known ratchet-and-pawl device, or any other suitable construction common in writing-machines for this purpose.

In order to insure register of the type-bar slots with the vertical or longitudinal rows of pins in the pin-cylinder, when the holder enters the latter, a collar U is loosely mounted on the shaft $A^3$ or yoke $K^2$ and provided with a radial arm $U'$, which has a tooth $U^2$ on its end which projects slightly beyond the face of the type on the type-bars. This arm is connected to the yoke $K^2$ by a spring $U^4$, and when the holder is released from gear $i$ the tooth $U^2$ contacts with one of a pair of diametrically opposite dogs $u$, pivoted on the upper end of the pin-cylinder and pressed inward by a spring $u'$, but have their movement limited by stops $u^2$. The said dogs pull the arms forward and spring $U^4$ draws the holder up until a key $K^7$ thereon registers with a vertical groove $B^7$ in the pin-cylinder, when the holder drops into the pin-cylinder, being guided in its descent and moved along by and with the pin-cylinder, through the key $K^7$ in the groove $B^7$, as is apparent. The tooth $U^2$ enters groove $B^8$ in the pin-cylinder beside groove $B^7$. As shown, there are two pairs of grooves $B^7$ $B^8$, diametrically opposite each other, to permit the descent of the holder into the pin-cylinder at each half-revolution thereof, as the said pin-cylinder is calculated to make but a half-revolution for each revolution and entry of the type-bar holder K, as is evident.

From the foregoing it will be understood that the type-bar holder is rotated by and with the pin-cylinder so long as the said holder is within the said pin-cylinder, and when it leaves and is disengaged from the said pin-cylinder it is then rotated independent thereof during the printing operation by the gears $i'$ and is released from the said gears when its revolution is completed and it is again in position to have its arm $U'$ caught by a dog $u$ and then moved forward by and with the pin-cylinder during its telescoping therewith.

Any suitable inking device may be used in connection with this machine, which device in practice I prefer to have located at a point in or upon the casing $a$, so that the alined type will receive ink therefrom before they rotate against the paper to be printed upon.

The operation of the machine is as follows: The machine being ready for operation and all of its several parts being in their normal positions, the operator successively depresses the keys in the different rows of the keyboard, either separately or simultaneously, to spell the words desired. In this connection it is to be noted that by the arrangement of the machine a word may be spelled out letter by letter on the first row of keys, or all the letters comprising the word or phrase may be simultaneously struck or depressed. The keys depressed operate push-pins and the latter project pins in the pin-cylinder B. The pin-cylinder, which has a rotary movement, rotates one step or notch for each push-pin operated, and when the said pin-cylinder has made a half-revolution the type-bar holder descends therein, and, the type-bars in the holder being freed from their locks, drop down with the holder; but every bar caught by a projected pin is upheld, so that a row of type is set up on the holder corresponding to the letters of the keys that projected the push-pins. Then the locking-plate $l$ is turned so as to lock the type-bars on the holder in the position the pins have stopped them, and the holder rises, bringing the alined row of type up to the opening $a^3$ opposite the platen on the paper-carriage. The gear Q then engages rack $R^6$, and as the holder rotates the platen is drawn past the opening and the impressions are taken from the alined type upon the paper on the platen. Gear Q then releases rack $R^6$ and the paper-carriage returns to its starting-point, while the holder continues to rotate until it comes into position to descend into the pin-cylinder. In the meantime the operator has been working and other rows of pins have been projected in the other half of the pin-cylinder, which is moved under the holder, and the latter descends thereinto, its type-bars being first released, so that the bars can be shifted as desired by the projected pins in the cylinder that lie in the path of the type-bars on the descending holder.

The operator can continue to operate the keys and set up pins in the pin-cylinder without interruption, as the said pin-cylinder is of such size that the type-bar holder when within the said pin-cylinder does not interfere with the setting up or projecting of the said pins or stops therein. After the pins have operated a set of type-bars they are retracted or returned to their normal position in the pin-cylinder by the roller X or other suitable means before they are again passed before the push-pins or come to a position to engage with the type-bars a second time.

The advantages of this invention will be obvious to those skilled in the art, and also its adaptability to various purposes besides type-writing, for, obviously, it can be adapted to matrix-making machines, for embossing, and for various uses in the printing arts. The type-bars may be replaced by matrix-bars, so as to produce relief-impressions or raised letters, all these advantages being within the scope of the invention; but I have not gone into detail description of its many uses, as it would burden this application with an unnecessary mass of descriptive matter.

Having described my invention, I claim—

1. The combination of a rotary holder and a series of parallel longitudinally-movable type-bars thereon, with adjustable type-bar stops, and means for simultaneously bringing the bars into contact with the stops whereby the bars are simultaneously shifted, as set forth.

2. The combination of a rotary holder, and a series of parallel longitudinally-movable type or matrix bars thereon, adjustable type-bar stops and means for simultaneously bringing the bars into contact with the stops, whereby the bars are simultaneously shifted, with mechanism for taking an impress from the alined type on the bars after they have been adjusted by contact with the stops, as set forth.

3. The combination of a rotary holder and a series of parallel longitudinally-movable type or matrix bars thereon, series of adjustable type-bar stops, keys and connections for projecting said stops, with mechanism for simultaneously moving the type-bars against the stops, whereby the bars are adjusted by contact with the projected stops, as set forth.

4. The combination of a rotary holder and a series of parallel longitudinally-movable type-bars thereon, series of adjustable type-bar stops, keys and connections for projecting said stops and mechanism for simultaneously moving the type-bars against the stops, whereby the bars are adjusted by contact with the stops, with means for taking an impression from the alined types on the bars after they have been adjusted by contact with the stops, as set forth.

5. The combination of a rotary holder and a series of parallel longitudinally-movable type or matrix bars thereon, adjustable type-bar stops, and means for simultaneously bringing the bars into contact with the stops, whereby the bars are simultaneously shifted, with means for locking the type-bars after contact with the stops, means for removing the adjusted and locked type-bars to the point of imprinting, and means for taking an impression from the types, as set forth.

6. The combination of a rotary holder and a series of parallel longitudinally-movable type-bars thereon, series of adjustable type-bar stops, keys and connections for projecting said stops, mechanism for simultaneously moving the type-bars against the stops, whereby the bars are adjusted and the proper types thereon brought into alinement, means for locking the adjusted type-bars, mechanism for removing the locked and alined type-bars to the imprinting-point, and mechanism for releasing the said type-bars from their locked position, as set forth.

7. The combination of a rotary type-bar holder, a series of longitudinally-movable type-bars therein, a series of type-bar stops, a holder for said stops and keys for operating said stops, with mechanism whereby the type-bar holder and stop-holder are telescoped so as to cause the stops to adjust the type-bars, as set forth.

8. The combination of a rotary type-bar holder, a series of parallel longitudinally-movable type or matrix bars thereon, series of type-bar stops, a holder therefor, and keys for operating said stops, with mechanism whereby the bar-holder and stop-holder are telescoped so as to cause the stops to adjust the type-bars, and means for taking an impress or print from the alined type on the bars, as set forth.

9. The combination of a rotary type-bar holder, a series of movable type-bars thereon, with type-bar stops independent of the holder, means for shifting said stops, and means for bringing them simultaneously into contact with the type-bars, as set forth.

10. The combination of a rotary type-bar holder, a series of movable type-bars thereon, type-bar stops independent of the holder, means for shifting said stops, and means for bringing them simultaneously into contact with the type-bars, with means for taking an impression from the alined type on the bars after the holder is free from the stops, as set forth.

11. The combination of a multiple series of vertical and horizontal rows of type-bar stops or shifters moving in an endless path, means for projecting stops in each series located at one side of their path, and means for returning the stops to normal position before they again pass the projecting devices, with a series of parallel longitudinally-movable type-bars, means whereby said bars are simultaneously shifted by said stops, mechanism for locking the type-bars after they are shifted, and means for taking an impress from the alined type on the locked bars, substantially as set forth.

12. The combination of a series of movable type-bars, a multiplicity of series of bar-stops mounted on a rotary support, keys and devices for shifting said stops, and means for bringing the type-bars simultaneously into contact with the projected stops at one side of the support, whereby the bars can be shifted by one set of projected stops while another set of stops is being projected, and mechanism for locking the type-bars after they are shifted, with means for moving the said locked bars to an impression-point and devices for taking an impression therefrom, while the stops are being shifted ready to shift and aline another line of type, as set forth.

13. The combination of a parti-cylindrical holder and a series of longitudinally-movable type-bars attached to the said holder, a rotary stop-cylinder having series of vertical rows of stops mounted on said cylinder and means for projecting stops in successive rows, with means for telescoping the bar-holder and stop-cylinder so as to simultaneously shift the type-bars by projected stops on the cylinder, as set forth.

14. The combination of a parti-cylindrical holder and a series of parallel longitudinally-movable type-bars attached to said holder, a rotary stop-cylinder having series of vertical rows of stops mounted on said cylinder and means for projecting stops in successive rows, with means for telescoping the bar-holder and stop-cylinder so as to simultaneously shift the type-bars by projected stops on the cylinder, devices for locking the type-bars after contact with the stops, and mechanism for taking an impression from the bars while locked, as set forth.

15. The combination of the type-bar holder and longitudinally-movable type-bars thereon, cylindrical series of rows of stop-pins, means whereby the stops in successive rows can be projected, mechanism whereby the type-bar holder can be intermittently brought into contact with the projected stops so that the type-bars thereon will contact therewith and be shifted by pins in different rows at alternate telescoping movements, as set forth.

16. The combination of the type-bar holder and longitudinally-movable type-bars thereon, cylindrical series of rows of stop-pins, means whereby the stops in successive rows can be projected, mechanism whereby the type-bar holder can be intermittently brought into contact with the projected stops so that the type-bars thereon will contact with, and be shifted by pins in different rows at alternate telescoping movements, means for locking the bars when shifted, mechanism for taking an impression from alined types on the bars while locked and devices for releasing the bars after each impression, substantially as described.

17. The combination of a rotary holder carrying a series of longitudinally-movable type-bars, and means for reciprocating said holder longitudinally, with devices for locking the bars in the holder and means for shifting the bars after each impression, substantially as described.

18. In a machine of the character described the combination of a rotary holder, a series of parallel longitudinally-movable type-bars carried by said holder, means for reciprocating said holder, means for variably shifting the bars in the holder when it moves in one direction, and means for taking an imprint from the alined type on the bars when the holder is free of the bar-shifting devices, as and for the purpose set forth.

19. In a machine of the character described the combination of a type-bar holder, a rotating pin-cylinder having type-bar shifters, mechanism for telescoping the holder and cylinder, and means for taking an imprint from the type-bars in the holder when clear of the shifters or stops substantially as described.

20. In a machine of the character described the combination of a reciprocating rotary type-bar holder, a cylinder provided with means for shifting the type-bars in the holder, keys and connections controlling the shifting devices, means for locking the bars after being shifted, and mechanism for taking an imprint of the alined characters on the bars, as set forth.

21. The combination of a type-bar holder, a pin-cylinder containing pins or stops adapted to shift the type-bars in the holder, keys for controlling the projecting of the pins, mechanism for alternately moving the said holder into and out of the pin-cylinder, means for locking the bars after they are shifted, and mechanism for taking an impression from the alined characters on the bars after the holder is clear of the stop-pins, as set forth.

22. The combination of a rotating cylinder, a multiplicity of series of type-bar stops mounted on said cylinder, with a series of stationary devices adapted to trip correspondingly-located stops in any series on the cylinder brought opposite the trip devices, keys controlling said trip devices, and mechanism for turning said cylinder so as to move a new series of stops into register with the trip devices upon the action of any trip, substantially as described.

23. The combination of a type-bar holder, and a series of longitudinally-movable type-bars thereon, with a rotating pin-cylinder provided with series of stop-pins, substantially as described, adapted to control the shifting of the type-bars in the holder when projected, a series of pin-pushers, keys controlling said pushers, and mechanism whereby the cylinder is given a step-by-step rotary movement, as set forth.

24. The combination of a cylindrical type-bar holder, and a series of longitudinally-movable type-bars thereon, a rotating pin-cylinder provided with series of stop-pins adapted to control the shifting of the type-bars in the holder when projected, a series of pin-pushers, keys controlling said pin-pushers, and mechanism whereby the pin-cylinder is given a step-by-step movement, with mechanism whereby the type-bar holder is intermittently telescoped with the pin-cylinder, and mechanism for taking an imprint or impression from the alined type on the bars when the holder is free of the cylinder, as set forth.

25. The combination of a rotatable type-bar holder, a series of longitudinally-movable type-bars therein, a rotating cylinder provided with a multiplicity of series of type-bar stops, a series of stop-operating devices, adapted to coact with any series of stops with which they register on the cylinder, keys controlling said devices, and mechanism for shifting successive series of stops into register with the tripping devices, substantially as described.

26. The combination of a rotatable type-bar holder, a series of longitudinally-movable type-bars therein, a rotating cylinder provided with a multiplicity of series of type-bar stops, a series of stop-operating devices adapted to coact with any series of stops with which they register on the cylinder, keys controlling said devices, and mechanism for shifting successive series of stops into register with the tripping devices, with mechanism for intermittently telescoping the holder and cylinder, and means for taking an imprint or impression from the alined type on the bars when the holder is clear of the cylinder, substantially as described.

27. The combination of a rotary holder carrying a series of longitudinally-movable type-bars, mechanism for reciprocating said holder longitudinally of the bars, and mechanism for rotating the said holder, with means for shifting the bars, means for locking the bars when shifted, mechanism for taking an impression from the locked bars, and means for unlocking the bars after each impression, as set forth.

28. In a machine of the character described the combination of a type-bar holder, a rotating pin-cylinder carrying type-bar stops, with mechanism for taking an impression from a line of type on the bars after the bars are shifted, as set forth.

29. The combination of a reciprocating and rotating type-bar holder and longitudinally-movable type-bars thereon, a rotary cylinder provided with means for arresting or shifting the type-bars in the holder, keys controlling the bar-shifting devices, and means for telescoping the holder and cylinder, as set forth.

30. The combination of a reciprocating and rotating type-bar holder and longitudinally-movable type-bars thereon, a rotary cylinder provided with means for arresting or shifting the type-bars in the holder, keys controlling the bar-shifting devices and means for telescoping the holder and cylinder, with means for locking the bars after being shifted, and mechanism for taking an impression from the alined characters on the bars, as set forth.

31. The combination of a rotating cylinder, a multiplicity of series of type-bar stops mounted on said cylinder, a series of stationary devices adapted to trip correspondingly-located stops in any series on the cylinder brought opposite the trip devices, keys controlling said trip devices, and mechanism for turning said cylinder so as to move a new series of stops into register with the trip devices upon the action of any trip, with type-bar holder, a series of type-bars thereon, means for moving said holder so as to bring the bars into contact with the stops, devices for locking the bars after shifting, and means for taking an impression from the alined type on the bars, substantially as set forth.

32. The combination of the type-bar holder, the longitudinally-movable type-bars therein, the paper-carriage and platen, and a series of type-bar stops, with mechanism for reciprocating said holder, means for rotating it after the bars are shifted and locked therein, and means for moving the carriage past the holder when the latter is in printing position so as to take an impression from the alined type thereon, as set forth.

33. The combination of the type-bar holder, the pin-cylinder and paper-carriage, with mechanism for shifting the pins in the cylinder, mechanism for telescoping the cylinder and the holder, mechanism for rotating the holder when clear of the cylinder, and mechanism for moving the paper-carriage past the holder when the latter is in printing position, as set forth.

34. The combination of the type-bar holder and type-bars thereon, a pin-cylinder and pins therein, pin-shifting devices and controlling-keys therefor, mechanism for lowering the holder into the pin-cylinder, mechanism for raising the holder from the cylinder and giving it a partial rotation when clear of the cylinder, as and for the purpose set forth.

35. The combination of a type-bar holder and type-bars thereon, a pin-cylinder and pins therein, pin-shifting devices and controlling-keys therefor, mechanism for lowering the holder into the pin-cylinder, mechanism for raising the holder from the cylinder and giving it a partial rotation when clear of the cylinder, with a paper-carriage movable at right angles to the holder, and means whereby the carriage is moved past the holder when the latter is in printing position so as to take an impression from the alined type thereon, substantially as described.

36. The combination of a hollow cylinder, the series of stop-pins thereon, and means for rotating the said cylinder, sets of pin-pushers at one side of the cylinder, springs for retracting said pushers, electromagnetic devices for forcing said pushers against the pins, and electrical key-contacts and electrical connections between the respective keys and the push-pin magnets, substantially as described.

37. The combination of a type-bar holder and the type-bars thereon, a pin-cylinder and pins therein, pin-shifting devices and keys for controlling the same, mechanism for lowering the holder into the pin-cylinder, mechanism for raising the holder from the cylinder, and mechanism for giving the said holder a partial rotation while in the cylinder, and mechanism for completing the rotation of the holder when clear of the cylinder, with a paper-carriage movable at right angles to the holder, and means whereby the carriage is moved past the holder when the latter is in printing position so as to take an impression from the alined type thereon, as set forth.

38. The combination of a hollow cylinder having a series of vertical rows of pins in it, a stationary row of spring-retracted pin-pushers, beside the cylinder, keys and connections for operating said pushers, and means for rotating the cylinder, with a type-bar holder, mechanism for lowering said holder into the pin-cylinder and raising it therefrom after a partial revolution therewith, and mechanism for completing the rotation of the holder when clear of the cylinder, as set forth.

39. The combination of the type-bar holder and the bars thereon, a pin-cylinder and pins therein, pin-shifting devices and keys for controlling the same, mechanism for lowering the holder into the pin-cylinder, mechanism for raising the holder from the cylinder after a partial revolution, mechanism for causing the said holder to move with the pin-cylinder while therein, and mechanism for completing the rotation of the holder when clear of the cylinder, and means for taking an impression from the alined line of type in the said holder, as set forth.

40. The combination of the hollow cylinder, the series of stop-pins thereon, and means for rotating the said cylinder, sets of pin-pushers at one side of the cylinder, springs for retracting said pushers, electromagnetic devices for forcing said pushers against the stop-pins, and electrical key-contacts and electrical connections between the respective keys and push-pin magnets, a paper-carriage and mechanism for moving said carriage past the holder when in printing position so as to take an impression from the type thereon, and means for retracting the carriage to normal position after the printing operation, as set forth.

41. The combination with a type-bar holder, a series of parallel longitudinally-movable type-bars thereon, and a locking-plate movable at right angles to said bars, with means for reciprocating said holder, means for shifting the bars by arresting their movement when the holder is moved in one direction, means for shifting the plate to lock the bars after they have been shifted, mechanism for taking an impression from the alined types on the locked bars, and mechanism for releasing the locking-plate after the impression has been made, as set forth.

42. The combination of a rotatable hollow cylinder having a series of parallel rows or stops in it, a number of rows of pin-pushers at one side of the cylinder, keys and connections for operating said pushers, and an escapement mechanism, whereby the cylinder is moved a number of steps or spaces equal to the highest number of rows in which keys on the keyboard are depressed, as set forth.

43. The combination of a series of stops or trip-pins mounted on a rotatable support, and a less number of parallel rows of pin-actuating or shifting devices mounted on a stationary support, corresponding rows of keys controlling said shifting devices, means for rotating the pin-support, an escapement mechanism for controlling the movement of the said cylinder step by step, and connections between the said escapement mechanism and the keyboard, whereby the cylinder is allowed to move a number of steps or spaces equal to the number of the row in which the key depressed is located, substantially as described.

44. The combination of a rotatable cylinder having a series of parallel rows of stops or pins in it, a number of rows of pin-pushers at one side of the cylinder, keys and connections for operating said pushers, and an escapement mechanism whereby the cylinder is controlled in its movement, substantially as described, with a type-bar holder, means for allowing the holder to descend into and partly rotate with the pin-cylinder, mechanism for raising it from the pin-cylinder, and mechanism for completing its rotation, as set forth.

45. The combination of the pin-cylinder, the series of stop-pins thereon, sets of pin-pushers at one side of the cylinder, electromagnets for forcing said pushers against the pins, and springs for retracting the said pin-pushers, with means for rotating the cylinder, an electromagnetic escapement for controlling the extent of movement of the cylinder, a keyboard having circuit-closing keys and electrical connections substantially as described, whereby the depression of any key establishes an electric circuit through the corresponding push-pin magnets and through the escapement, as set forth.

46. The combination of a pin-cylinder, its pins, the push-pins, electromagnets for operating said pins, means for rotating the cylinder, and an escapement mechanism therefor controlled by an electromagnet; with a keyboard provided with circuit-closing keys and electrical connections, substantially as described, whereby upon the depression of any key the corresponding push-pin magnet is energized, and upon the subsequent release of the key the escapement is released allowing the pin-cylinder to partly rotate, substantially as described.

47. The combination of the type-bar holder and mechanism for alternately shifting and locking the bars, and for rotating the holder after each shifting of the bars; with a paper-carriage and a release-gearing between the holder and the carriage whereby it is moved past the holder and takes an impression from the alined line of type on the bars at each rotation of the holder, and means for returning the carriage to normal position after each impression is completed, as set forth.

48. The combination of the pin-cylinder, the type-bar holder, and means for lowering the holder into and out of the pin-cylinder, with the devices substantially as described, whereby the holder is brought to register with and locked to the cylinder while it is entering, in, and leaving the cylinder, as set forth.

49. The combination of a rotatable pin-cylinder, and the rotating and reciprocating type-bar holder, with the registering-arm attached to the holder, a dog on the cylinder adapted to catch said arm and cause it to bring keys and grooves on the holder and cylinder into register, as set forth.

50. The combination of the stationary main shaft or support, the pin-cylinder surrounding said support, the holder rotatably mounted on said shaft above the cylinder and means for lowering the holder in the cylinder and allowing it to partially rotate therewith, and means for raising the holder clear of the cylinder and completing its rotation, with mechanism substantially as described, whereby the holder is brought to register with the pin-cylinder and locked thereto while telescoping therewith substantially as described.

51. The combination of the pin-cylinder, the spring for rotating said cylinder, the main shaft and the clutch-gear for winding said spring intermittently, and means for operating said gear, as set forth.

52. The combination of the pin-cylinder, the type-bar holder, the rack for raising said holder, the gearing for raising said rack, the main driving-shaft and a clutch for throwing said gear into and out of action at the proper times, as set forth.

53. The combination of the pin-cylinder, the type-bar holder, the rack for raising said holder, the main shaft, a sleeve on said shaft, gearing between said sleeve and rack, and a clutch for locking said sleeve to the rack, as set forth.

54. The combination of the pin-cylinder, the type-bar holder, the rack for raising said holder, the main driving-shaft, a sleeve on said shaft, gearing between said sleeve and rack and a clutch for locking said sleeve to the rack, with the train of gearing driven by said sleeve, a device for locking said gearing as the clutch is disengaged from the sleeve and devices for releasing said lock when the holder is to descend, substantially as described.

55. The combination of the pin-cylinder, the type-bar holder, mechanism for lowering the holder, an electrically-controlled release for said mechanism, and the circuit-closer on the holder, and electrical connections between said holder and release, whereby said mechanism is released when the holder is in position to descend, and means for releasing said holder at the proper time, as set forth.

56. The combination of the pin-cylinder, the type-bar holder, mechanism for raising said holder, an electrical motor for operating said elevating mechanism, a circuit-closer controlled by the movement of the holder and electrical connections between said circuit-closer and motor, whereby the latter is thrown into circuit when the holder is ready to ascend, substantially as described.

57. The combination of the pin-cylinder, the type-bar holder, a main driving-shaft, mechanism for elevating and rotating said holder driven from said shaft, mechanism for lowering the holder and a lock for the lowering devices, with means for releasing the lock of the lowering mechanism when the holder is ready to descend, means whereby the main shaft is put in action when the holder is ready to ascend and kept in action until it is ready to again descend, and a mechanism whereby the elevating mechanism is thrown out of gear when the holder is elevated and the holder-rotating mechanism thrown into gear until the holder is ready to descend, as set forth.

58. The combination of the pin-cylinder, a spring for rotating it, a main shaft, a type-bar holder, gearing driven by said main shaft for elevating the holder, mechanism for rotating said holder when elevated, devices for lowering said holder, and means for locking said lowering devices, devices for releasing the said lock when the holder is ready to descend, with mechanism for rotating said main shaft when the holder is ready to ascend and keep it rotating until the holder is ready to descend a clutch mechanism whereby the elevating mechanism is disengaged from the main shaft when the holder is elevated, the holder-rotating devices, and spring-winding device engaged with the main shaft, substantially as and for the purpose described.

59. The combination of the pin-cylinder, the type-bar holder, adapted to telescope the cylinder, mechanism for raising said holder, a motor for operating said elevating mechanism and mechanism for lowering said holder; with an electrical circuit-closer on the holder and connections between the same and the lowering mechanism, whereby the latter is released when the holder descends, a second circuit-closer governed by the movement of the holder, and connections between said second circuit-closer and the motor, whereby the latter is thrown into action when the holder is ready to ascend, substantially as set forth.

60. The combination of the type-bar holder, mechanism for elevating said holder, mechanism for lowering said holder, a motor for operating said elevating mechanism, a lock for said lowering mechanism, and mechanism for rotating said holder when elevated also driven from the motor; with a circuit-closer operated by the holder for the releasing of the lock of the lowering mechanism when the holder is ready to descend, a second circuit-closer operated by the holder for throwing the motor into action when the holder is ready to ascend and keep it in action until the said holder is ready to descend, a clutch mechanism whereby the elevating mechanism is thrown out of gear when the holder is elevated and the rotating mechanism thrown into gear until the holder is ready to descend, substantially as described.

61. The combination of the pin-cylinder, the spring for rotating it, the type-bar holder, mechanism for guiding said holder into the pin-cylinder, a main shaft and gearing for raising said holder out of the cylinder, gearing for winding said spring driven from said main shaft, and clutch mechanism whereby the gearing for winding the spring is thrown out of action when the gear for raising the holder is in action, and vice versa, substantially as described.

62. The combination of the pin-cylinder, the spring for driving said cylinder, a main driving-shaft, a motor for driving said shaft, a type-bar holder, gearing driven from the main shaft for elevating said holder, mechanism for rotating said holder when elevated, device for lowering said holder, and an electrically-released lock for said lowering device; with a circuit-closer operated by the movement of the holder for releasing said lowering devices when the holder is ready to descend, a second circuit-closer operated by the holder for throwing the motor into action when the holder is ready to ascend and keep it in action until the holder is ready to descend, a clutch mechanism whereby the elevating mechanism is thrown out of gear with the main shaft when the holder is elevated and the rotating and spring-winding mechanism thrown in gear until the holder is ready to descend, substantially as described.

63. The combination of the type-bar holder, the rack for elevating said holder, the main shaft, the loose gear on said shaft meshing with said rack, an adjoining loose gear on said shaft meshing with a vertical shaft, a clutch splined on the main shaft adapted to lock it with gears, and the clutch-shifting devices operated by the ascent and descent of the type-bar holder, substantially as set forth.

64. The combination of the pin-cylinder, the spring for rotating it, the type-bar holder, mechanism for guiding said holder into the pin-cylinder a main shaft and gearing for raising said holder out of the cylinder, gearing for winding said spring driven from the main shaft, and clutch mechanism whereby the gearing for winding the spring is thrown out of action when the gearing for raising the holder is in action, and vice versa, with a motor for operating said shaft, electric circuit-closer controlled by the movement of the holder, whereby said motor is thrown into and out of circuit at the proper times, as set forth.

65. The combination of the pin-cylinder, spring for rotating it, the type-bar holder, mechanism for guiding said holder into the pin-cylinder a main shaft and gear for raising said holder out of the cylinder, gearing for winding said spring driven from the main shaft, and clutch mechanism whereby the mechanism for winding the spring is thrown out of action when the gearing for raising the holder is in action, and vice versa, with mechanism for rotating said holder when elevated operated by a vertical shaft, means for driving said shaft, and means controlled by the movement of the holder for throwing said driving means into or out of operation, substantially as set forth.

66. The combination of the holder, the rack for raising and lowering the same, a train of gearing meshing with said rack and mechanism for positively driving said gearing so as to elevate the holder, and means for throwing the driving device out of action when the holder is raised, a stop for arresting the back movement of the gearing, a solenoid for tripping said stop, and an electric circuit-closer operated by the holder for closing a circuit through the solenoid when the holder is in position to descend, as set forth.

67. The combination of the stationary shaft, the upper and lower casings surrounding the same, the pin-cylinder in the lower casing, the type-bar holder rotatably mounted on and guided by said shaft, the rack-bar for supporting and elevating said holder; with the main shaft, the motor for driving said shaft, a vertical shaft meshing with a bevel-gear on the main shaft, a loose sleeve on said shaft provided with a pinion meshing with said rack and with a train of gears for regulating the descent of the holder, a clutch for alternately locking the sleeve and said bevel-gear to the main shaft, a circuit-closer operated by the movement of the holder for throwing the current on and off the motor, a stop mechanism for arresting the descent of the holder when the sleeve is disengaged from the main shaft, a magneto-electric device for releasing said stop, a circuit-closer operated by the movement of the holder and controlling said magneto devices, and means for rotating the holder when elevated by the vertical shaft, as set forth.

68. The combination of the stationary shaft or support, the pin-cylinder, the type-bar holder rotatably mounted on and guided by said shaft, the rack-bar for elevating and supporting said holder; with the main shaft, the motor for driving said shaft, a vertical shaft meshing with a bevel-gear on the main shaft, a loose sleeve on said shaft provided with a pinion meshing with said rack and with a train of gears for regulating the descent of holder, a clutch for alternately locking the sleeve and said bevel-gear to the main shaft, a circuit-closer operated by the movement of the holder for throwing the current on and off the motor, a stop mechanism for arresting the descent of the holder when the sleeve is disengaged from the main shaft, a magneto-electric device for releasing said stop, a second circuit-closer operated by the movement of the holder and controlling said magneto device, and means for rotating the holder when elevated operated by the vertical shaft, a spring-motor for driving the pin-cylinder, gearing for winding said motor from the vertical shaft, and means for taking an impression from the type on the holder when in printing position also operated through the vertical shaft, substantially as set forth.

69. The combination of a revolving pin-holder, adjustable pins or stops therein, means for projecting the pins or stops, means for revolving said pin-holder, and means for returning the pins or stops in the pin-holder to their normal position after they have performed their proper office with the type-bar holder, movable types thereon, means for lowering the said type-bar holder to bring the types thereon in contact with the projected stops, means for moving said holder with the pin-holder until the said holder has been returned to its normal position, means for continuing the rotation of the type-holder after it returns to its normal position, and means for taking an imprint from the alined types on the holder, the different mechanisms arranged to operate automatically and in their proper order upon the depression of the keys on the keyboard, as set forth.

70. The combination of a revolving pin-holder, adjustable pins or stops therein, means for projecting said pins or stops, means for revolving said holder, escapement mechanism for regulating the degree of rotation of the pin-holder, and suitable means for returning the stops or pins to their normal position in the holder after they have performed their proper office, with a type-holder having a rotary and endwise movement movable types thereon, means for lowering the said holder to bring the types thereon in contact with the projected stop-pins to shift the type, means for moving said holder with the pin-holder, means for raising the type-holder from contact with the stop-pins, means for continuing the rotation of the type-holder after it is clear of the pin-holder, and means substantially as described for taking an impress from the alined types on the holder, as set forth.

71. The combination of a revolving pin-holder, movable stops therein, of a type-bar holder having movable type-bars thereon and having a reciprocating and rotary movement, the movable type-bars being adapted to contact with the projected stops in the pin-holder for the purpose of bringing a number of predetermined letters into alinement on the holder, and a locking mechanism adapted to lock said type-bars in position on the holder by the downward movement of the said holder when it shall have reached its lowest point, and mechanism for releasing the bars from their locked position by the rotary movement thereof, as set forth.

72. The combination of a revolving pin-holder, adjustable pins or stops therein, means for projecting said pins, means for revolving said holder, escapement mechanism for regulating the degree of rotation of the pin-holder, means for returning the pins to their normal position in the holder after they have performed their proper office, with an electric motor and properly-controlled circuits and connections whereby the said mechanisms are operated, as set forth.

73. The combination of a rotary pin-holder, pins or stops therein, means for projecting the stops or pins therein, means for causing the holder to pass the projecting mechanisms to bring unacted-upon rows of pins into position to be projected, escapement mechanism for regulating the extent of movement of the said pin-holder, means for returning the pins to their normal position after they have performed their proper office, with a reciprocating and rotating type-holder, movable type-bars thereon, means for causing said holder to descend to shift the type-bars thereon by contact with the projected pins in the pin-holder, means for locking the shifted type-bars to the holder, and means for raising said type-holder to the printing-line, as set forth.

74. The combination of a traveling pin-holder, adjustable stop-pins therein, suitable electrically-controlled mechanisms for projecting said stop mechanisms, with mechanism for passing the pin-holder across the face of the projecting mechanism to bring successive rows of pins into position to be projected by the projecting mechanism, and electrically-controlled mechanism for controlling the extent of movement of the said pin-holder, as and for the purpose set forth.

75. The combination of a traveling pin-holder provided with suitable stop-pins, electrically-controlled mechanism for projecting said stops or pins, means for passing the pin-holder across the face of the pin-projecting mechanism to bring successive stops or pins into position to be acted upon, electrically-controlled mechanism for limiting the extent of movement of the pin-holder, with a series of longitudinally-movable type-bars adapted to contact with the projected stops in the said holder to bring a number of type or other characters into alinement for printing, as set forth.

76. The combination of a traveling pin-holder provided with suitable stop mechanisms, electrically-controlled mechanisms for projecting said stops, mechanism for passing the holder across the face of the pin-projecting mechanism, electrically-controlled mechanism for limiting the extent of travel of the pin-holder, with a vertically-movable type-bar holder, series of longitudinally-movable type-bars thereon and adapted to contact with the projected stops in the pin-holder to aline a line of type, and suitable means for locking said type in alinement, as set forth.

77. The combination of a traveling pin-holder provided with suitable stop mechanisms controlled by the electric current, means for controlling the movement of the projecting mechanism, means for passing the stop-holder across the face of the projecting mechanisms, electrically-controlled mechanism for limiting the extent of movement of the pin-holder, with a holder, a series of movable type-bars thereon adapted to contact with a series of projected stops in the said pin-holder, mechanism for locking said bars in position on the holder after they have been shifted by contact with the projected pins, means for raising said alined type to the printing-point, and mechanism for taking an impression from the alined type on the said holder, as set forth.

78. In a machine of the character described the combination of a stationary support, a longitudinally-sliding rod secured therein and a clutch mechanism operated thereby, with a reciprocating holder adapted to cause the reciprocation of the said rod to throw the clutch, and means for operating the said holder, as set forth.

79. In a machine of the character described the combination of a reciprocating holder having type-bars thereon, with a locking-plate secured on said holder to the rear of said bars, a vertical rod secured on said holder, and a crank-lever adapted to engage said rod and said plate whereby the said plate is thrown to lock the type-bars on the holder, as set forth.

80. In a machine of the character described the combination of a rotating and reciprocating holder having movable type-bars thereon, with a locking-plate secured on said holder to the rear of said bars, a vertical rod secured on said holder, and crank-lever engaging said rod and said plate, whereby the said plate is thrown to lock the type-bars on the holder, and means for retracting the locking-plate by the rotation of the holder, as set forth.

81. In a machine of the character described the combination of a rotating and reciprocating holder having movable type-bars thereon, with a locking-plate secured on said holder to the rear of said bars, means for shifting said plate to lock the bars on the holder when the said holder has reached the end of its reciprocation, and means for reshifting said plate to release the bars by the rotation of the holder, as set forth.

82. In a machine of the character described the combination of a stationary support, a reciprocating type-bar holder mounted thereon, a rack secured to said holder, and mechanism for raising said holder, and mechanism for locking said holder when in its raised position, with means for releasing said holder to permit its descent, and mechanism to govern the speed of descent of the said holder, substantially as described.

83. In a machine of the character described the combination of a stationary support and a reciprocating type-holder mounted thereon and an electric motor, with a reciprocating bar mounted on said support and an electric-circuit-closing device adapted to be operated by the said holder through the said bar to throw the motor into operation to raise the said holder, as set forth.

84. The combination with a pin-cylinder provided with stop-pins, substantially as described, of a series of pin-pushers, keys controlling said pin-pushers, and means whereby the pin-cylinder is given a rotary movement, as set forth.

85. The combination of a hollow cylinder having a series of vertical rows of pins in it, stationary row or rows of spring-retracted pin-pushers at one side of the cylinder, means for operating said pushers, and means for rotating the cylinder, as set forth.

86. The combination of a series of movable type-bars, a multiplicity of series of stops mounted on a rotary support, means for rotating said support, keys and devices for shifting said stops, and means for bringing the type-bars simultaneously into contact with the projected stops at one side of the support, whereby the bars can be shifted by one set of projected stops while another set of stops is being projected, as set forth.

87. The combination of a series of longitudinally-movable type-bars a series of stops mounted on a rotary support, means for adjusting said stops, and mechanism whereby the type-bars are simultaneously shifted by contact with the stops, with means for locking the bars after each shifting, and mechanism for taking an impression from a line of type on the type-bars while so locked, as set forth.

In testimony whereof I affix my signature in presence of two witnesses.

CHARLES ELMER ALLEN.

Witnesses:
 JEANNETTE R. WHITE,
 ABBY R. ALLEN.